United States Patent [19]

Yamabe

[11] Patent Number: 5,794,179
[45] Date of Patent: Aug. 11, 1998

[54] METHOD AND APPARATUS FOR PERFORMING BIT-ALLOCATION CODING FOR AN ACOUSTIC SIGNAL OF FREQUENCY REGION AND TIME REGION CORRECTION FOR AN ACOUSTIC SIGNAL AND METHOD AND APPARATUS FOR DECODING A DECODED ACOUSTIC SIGNAL

[75] Inventor: Takaaki Yamabe, Yokosuka, Japan

[73] Assignee: Victor Company of Japan, Ltd., Yokohama, Japan

[21] Appl. No.: 686,840

[22] Filed: Jul. 26, 1996

[30] Foreign Application Priority Data

Jul. 27, 1995 [JP] Japan ..................... 7-211220
Jan. 19, 1996 [JP] Japan ..................... 8-026004

[51] Int. Cl.$^6$ ........................................ G10L 7/00
[52] U.S. Cl. .................. 704/205; 704/204; 704/229
[58] Field of Search .......................... 704/229, 203, 704/204, 230, 205, 227, 212, 220, 219

[56] References Cited

U.S. PATENT DOCUMENTS

| | | | |
|---|---|---|---|
| 5,235,671 | 8/1993 | Mazor ..................... | 395/2.09 |
| 5,459,813 | 10/1995 | Klayman ................... | 395/2.18 |
| 5,517,511 | 5/1996 | Hardwick et al. .......... | 371/37.4 |
| 5,600,374 | 2/1997 | Shikakura ................ | 348/398 |

FOREIGN PATENT DOCUMENTS

4-185017  7/1992  Japan.
5-80777   4/1993  Japan.

*Primary Examiner*—David R. Hudspeth
*Assistant Examiner*—Donald L. Storm
*Attorney, Agent, or Firm*—Lowe Hauptman Gopstein Gilman & Berner

[57] ABSTRACT

A digital acoustic signal of a time region information is divided into a plurality of sub-band groups, and the number of bits allocated to each data of the sub-band groups is reduced by a reducing number Nr in a quantizing unit according to a maximum value selected among energy values of pieces of data in each sub-band group, so that the digital acoustic signal of a frequency region information is produced. Thereafter, Nr bits are added to each data of the digital acoustic signal of the frequency region information in the inversely quantizing unit, and the data of all sub-bands are combined to produce a reproduced digital acoustic signal of the time region information. Thereafter, a residual signal indicating a difference between the digital-acoustic signal of the time region information and the reproduced digital acoustic signal of the time region information is produced, and the residual signal and the reproduced digital acoustic signal of the frequency region information are multiplexed. Therefore, when a reproduced digital acoustic signal of the time region information is produced from the reproduced digital acoustic signal of the frequency region information and is corrected according to the residual signal in a decoding operation, the digital acoustic signal can be efficiently coded and decoded while maintaining the redundancy.

19 Claims, 12 Drawing Sheets

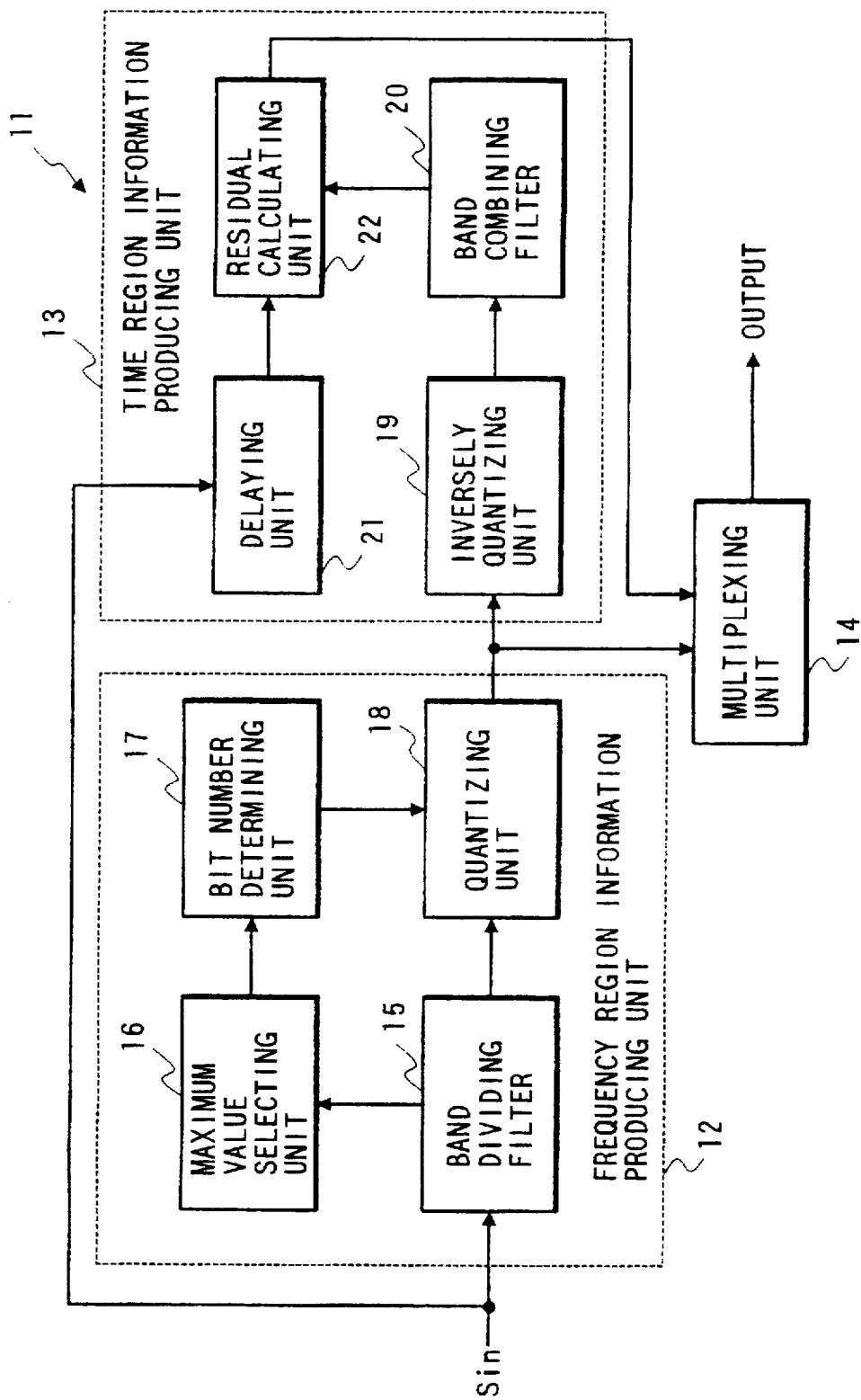

FIG. 2

| BIT NUMBER CODE | MAXIMUM VALUE S FOR EACH BAND |
|---|---|
| 0 | S = 0 |
| 2 | $-2 \leq S \leq 1$ |
| 3 | $-4 \leq S \leq 3$ |
| 4 | $-8 \leq S \leq 7$ |
| 5 | $-16 \leq S \leq 15$ |
| 6 | $-32 \leq S \leq 31$ |
| 7 | $-64 \leq S \leq 63$ |
| 8 | $-128 \leq S \leq 127$ |
| 9 | $-256 \leq S \leq 255$ |
| 10 | $-512 \leq S \leq 511$ |
| 11 | $-1024 \leq S \leq 1023$ |
| 12 | $-2048 \leq S \leq 2047$ |
| 13 | $-4096 \leq S \leq 4095$ |
| 14 | $-8192 \leq S \leq 8191$ |
| 15 | $-16384 \leq S \leq 16383$ |
| 16 | $-32768 \leq S \leq 32767$ |

FIG. 3

| BIT NUMBER CODE (BLOCK BIT WIDTH) | BLOCK MAXIMUM VALUE M |
|---|---|
| 0 | M = 0 |
| 2 | $-2 \leq M \leq 1$ |
| 3 | $-4 \leq M \leq 3$ |
| 4 | $-8 \leq M \leq 7$ |
| 5 | $-16 \leq M \leq 15$ |
| 6 | $-32 \leq M \leq 31$ |
| 7 | $-64 \leq M \leq 63$ |
| 8 | $-128 \leq M \leq 127$ |

FIG. 5

| | QUANTIZING UNIT | | | | INVERSELY QUANTIZING UNIT | |
|---|---|---|---|---|---|---|
| DECIMAL NOTATION | BINARY NOTATION | | | | SIGN BIT | INVERSELY QUANTIZED DATA |
| | SIGN BIT | REDUCED BITS | TRANSMITTED BITS | QUANTIZED DATA | | |
| 6 | 0 | 00000000 | 0000110 | 00000110 | 0 | 0000000000000110 |
| 31 | 0 | 00000000 | 0011111 | 00011111 | 0 | 0000000000011111 |
| 84 | 0 | 00000000 | 1010100 | 01010100 | 0 | 0000000001010100 |
| 24 | 0 | 00000000 | 0011000 | 00011000 | 0 | 0000000000011000 |
| -1 | 1 | 11111111 | 1111111 | 11111111 | 1 | 1111111111111111 |
| -30 | 1 | 11111111 | 1100010 | 11100010 | 1 | 1111111111100010 |
| -94 | 1 | 11111111 | 0100010 | 10100010 | 1 | 1111111110100010 |
| -61 | 1 | 11111111 | 1000011 | 11000011 | 1 | 1111111111000011 |
| -71 | 1 | 11111111 | 0111001 | 10111001 | 1 | 1111111110111001 |
| -24 | 1 | 11111111 | 1101000 | 11101000 | 1 | 1111111111101000 |
| 12 | 0 | 00000000 | 0001100 | 00001100 | 0 | 0000000000001100 |
| 54 | 0 | 00000000 | 0110110 | 00110110 | 0 | 0000000000110110 |

MAX

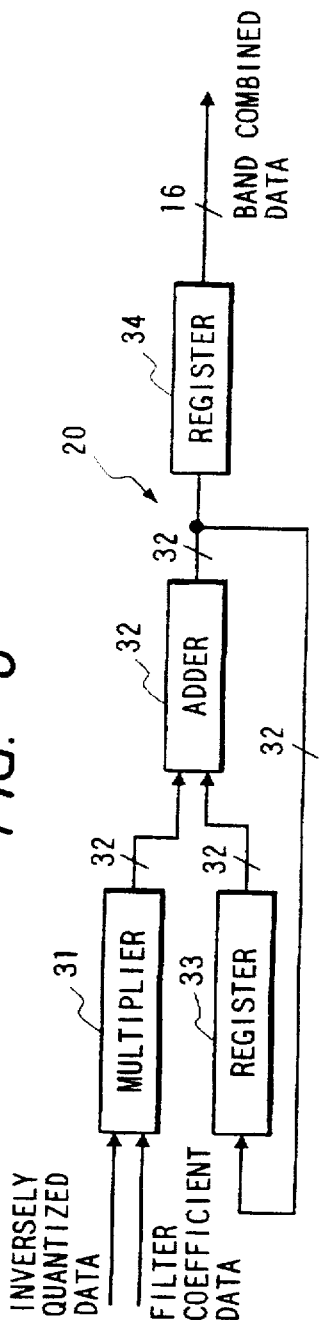
FIG. 6
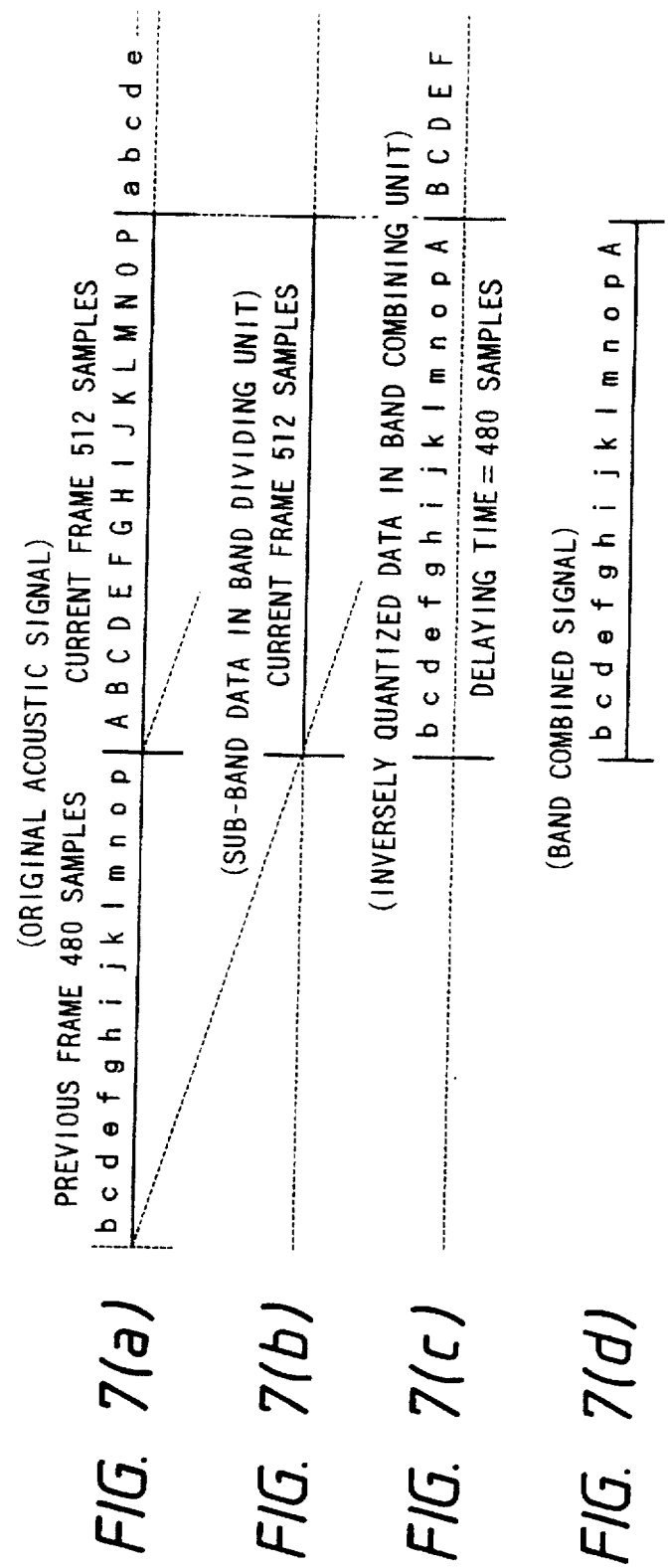
FIG. 7(a)
FIG. 7(b)
FIG. 7(c)
FIG. 7(d)

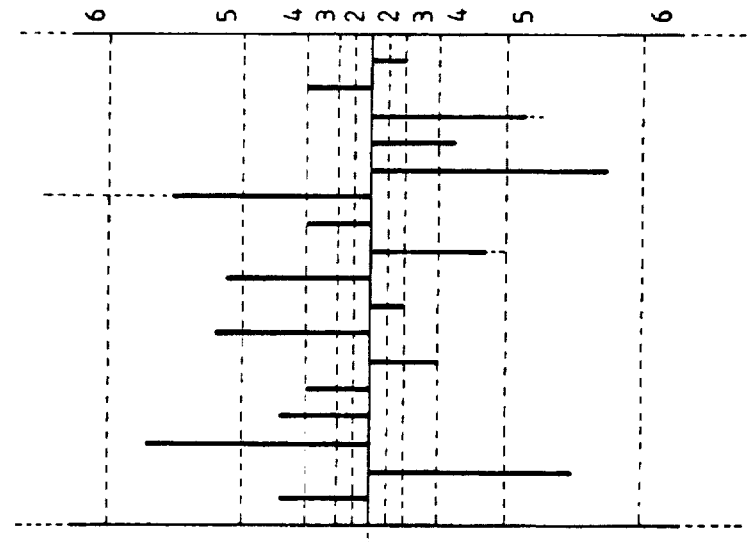
FIG. 13C ADJUSTED RESIDUAL SIGNAL
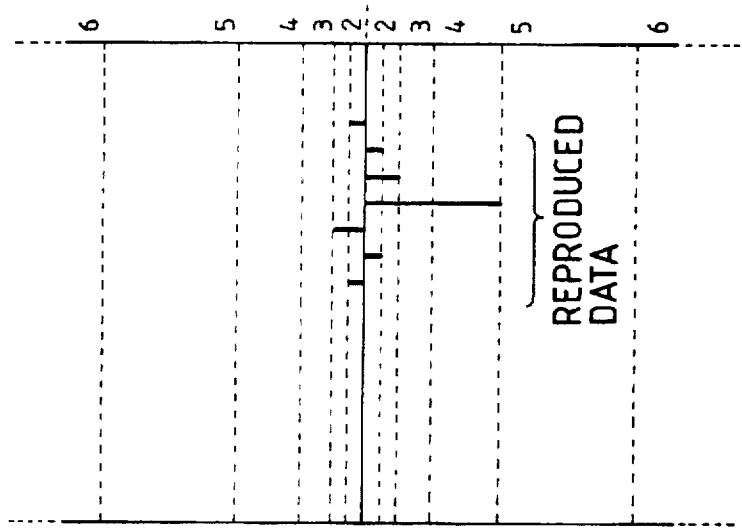
FIG. 13B REPRODUCED DATA
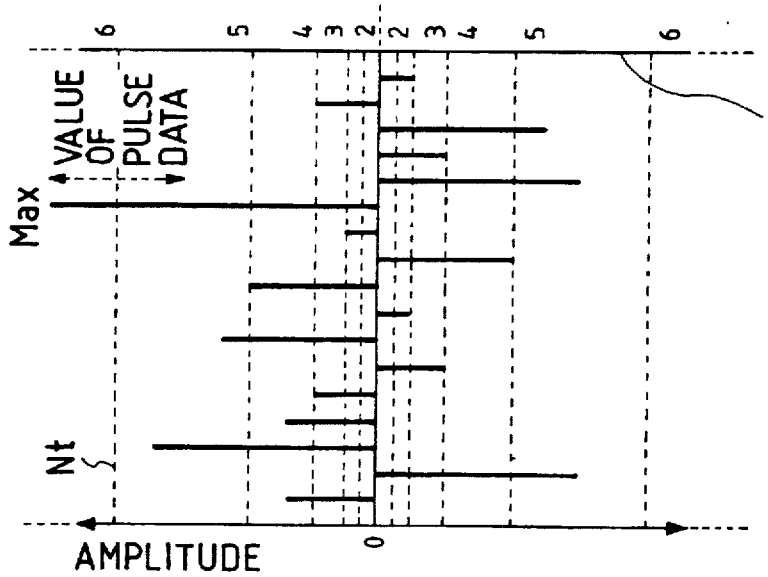
FIG. 13A RESIDUAL SIGNAL
THE NUMBER OF BITS ALLOCATED TO EACH DATA

1
METHOD AND APPARATUS FOR PERFORMING BIT-ALLOCATION CODING FOR AN ACOUSTIC SIGNAL OF FREQUENCY REGION AND TIME REGION CORRECTION FOR AN ACOUSTIC SIGNAL AND METHOD AND APPARATUS FOR DECODING A DECODED ACOUSTIC SIGNAL

BACKGROUND OF THE INVENTION

1. Field of the Invention

The present invention relates to method and apparatus for coding a digital acoustic signal or the like and method and apparatus for decoding the coded digital acoustic signal to reproduce loss-less information.

2. Description of the Related Art

In general, a series of digital-converted acoustic signals has some continuity and/or redundancy unless the series of digital-converted acoustic signals is composed of pieces of random data such as a white noise. Therefore, a plurality of loss-less compressing methods (or a plurality of reversible compressing methods) in which the continuity and/or redundancy of a series of digital-converted acoustic signals is used is well-known.

Also, correlation (or continuity) between a pair of samples of the acoustic signals adjacent to each other on a time axis can be easily detected by observing the acoustic signals. In addition, an amplitude distribution of a plurality of acoustic signals is generally one-sided. Therefore, a normal probability that each bit of digital data obtained by digitizing the acoustic signals is set to "0" or "1" has regularity. When the amplitude distribution is greatly one-sided, the redundancy of the acoustic signals is enlarged.

As an example of the reversible compressing methods, a differential pulse code modulation (PCM) method in which continuity of a music and a tendency that a difference value between a pair of samples adjacent to each other is generally lower than a value of each sample are used is well-known.

Also, as other examples of the reversible compressing methods, a predictive differential PCM method in which a value of a remarked sample is predicted from two values of a pair of samples adjacent to the remarked sample by using linearity of sample values and an adaptive-predictive differential PCM method in which a differential width is adaptively determined are well-known.

In addition, as other examples of the reversible compressing methods in which the redundancy of the acoustic signals is reduced by using a mathematical compressing method, an entropy coding method in which a one-sided occurrence distribution of digital signals is used and a vector coding method in which a pattern of a remarked signal matches with a pattern of a past signal or a referential signal and the remarked signal is coded are well-known.

Also, another compressing method in which pieces of time region information of a plurality of acoustic signals are frequency-converted to produce pieces of frequency region information and the frequency region information are adaptively distributed for each band according to a deviation degree of a spectrum distribution of the frequency region information to reduce a code volume and code the acoustic signals is well-known.

In the above examples, the differential PCM method is mainly adopted, and a combined compressing method of the differential PCM method and the entropy coding method such as a Haffman coding method is used. Also, the coding method using the frequency conversion is used for a non-reversible high efficiency coding method in which an auditory mental property or the like is used.

Also, as an example of an acoustic signal processing method in which a feedback structure is used, an active noise control method for positively reducing a noise component of a vibration sound of a machine such as a sound of an air conditioner fan or a engine sound of an automobile is well-known. In this active noise control method, an original signal relating to a noise component is analyzed, a component of an opposite phase to the original signal is overlapped with the original phase, and an acoustic signal treated as a noise component is canceled. The active noise control method with the Feedback structure is, for example, disclosed in a Published Unexamined Japanese Patent Application No. H5-80777 of 1993.

Also, as another example of the acoustic signal processing method in which the feedback structure is used, the high efficiency coding method in which a difference between an original signal and a reproduced signal obtained by coding and decoding the original signal is fed back to the original signal and a coding operation is repeated to reduce a quantization noise caused according to a psychoacoustic model is disclosed in a Published Unexamined Japanese Patent Application No. H4-185017 of 1992.

3. PROBLEMS TO BE SOLVED BY THE INVENTION

In the above conventional reversible acoustic coding method, when the coding in only a time region is desired, the coding in which characteristics given by the deviation of a frequency distribution of a acoustic signals are used cannot be performed, so that there is a drawback that the acoustic signals cannot be efficiently compressed. In particular, in cases where a signal having a considerably high amplitude in a high frequency exists, a difference bit width of 17 is required in the differential PCX method to have a dynamic range equivalent to a 16-bit linear PIX method for the purpose of expressing a difference value between a current signal and a previous signal. Therefore, when a plurality of acoustic signals in which amplitudes are considerably changed in a high frequency are coded, there is a drawback that a coding efficiency deteriorates.

Also, even though an adaptive prediction is adopted in the coding, when a music source having a prediction difficult characteristic is coded, a difference bit width is enlarged, so that a coding efficiency is not necessarily improved. Also, redundancy occurring from continuity and correlation in audio signals is not efficiently used in the mathematical compressing method. Therefore, a coding quality obtained in the mathematical compressing method is inferior to that obtained in a coding method in which characteristics of acoustic signals are used.

In addition, a coding method in which the frequency conversion (in particular, orthogonal conversion) is used is theoretically reversible. However, because a high quantization precision (or a high computing precision) is required to maintain the reversibility of the coding method, a quantization width of samples of frequency region information is enlarged. As a result, a large scaled coding apparatus in which the coding method is used is required to maintain the reversibility, and there is a drawback that a compression efficiency is not improved.

Also, in the acoustic signal processing method in which a noise component is positively canceled by using the feedback structure, though an offensive noise component to the ear is removed, a noise component of a particular frequency band s only removed. Therefore, it is difficult to remove a noise signal such as a computing error in which noise components are evenly distributed in a wide frequency band. Also, an amount of noise components caused by the computing error cannot be reduced. Therefore, in cases where a noise component caused by the computing error is coded to transmit an acoustic signal, even though the conventional active noise control method is applied to code the noise component caused by the computing error, an amount of coded information cannot be reduced.

Also, a coding method for reducing the quantization error caused according to the psychoacoustic model by using the feedback structure is a non-reversible compressing method, the coding method has no relation to a second object of the present invention (described later) in which an amplitude distribution of the computing errors is flattened.

SUMMARY OF THE INVENTION

A first object of the present invention is to provide, with due consideration to the drawbacks of such a conventional coding method, reversible acoustic coding and decoding methods for efficiently coding an acoustic signal and decoding the coded acoustic signal while perfectly maintaining reversibility and acoustic signal coding and decoding apparatuses for performing the reversible acoustic coding and decoding methods.

A second object of the present invention is to provide reversible acoustic coding method and apparatus for reducing a total amount of coded information on condition that an acoustic signal is efficiently coded while perfectly maintaining reversibility.

The first object is achieved by the provision of an acoustic coding method, comprising the steps of:

dividing a digital acoustic signal of time region information supplied as an original signal into one or more pieces of sub-band data for each of a plurality of sub-bands to change the digital acoustic signal of the time region information to a digital acoustic signal of frequency region information;

combining the pieces of sub-band data of all sub-bands to produce a band combined signal as a reproduced digital acoustic signal of time region information;

producing a residual signal from the reproduced digital acoustic signal of the time region information and the digital acoustic signal of the time region information as time region correcting information; and multiplexing the digital acoustic signal of the frequency region information and the time region correcting information to produce a bit stream as an output signal.

In the above steps, time region correcting information is produced by calculating a difference between the reproduced digital acoustic signal of the time region information obtained by combining the pieces of sub-band data of all sub-bands and the digital acoustic signal of the time region information supplied as the original signal, and the digital acoustic signal of the frequency region information and the time region correcting information are multiplexed as an output signal.

Accordingly, because the time region correcting information is coded with the digital acoustic signal of the frequency region information, the digital acoustic signal can be efficiently coded, and the coded digital acoustic signal can be efficiently reproduced while perfectly maintaining reversibility.

Also, the first object is achieved by the provision of an acoustic signal coding and decoding method, comprising the steps of:

dividing a digital acoustic signal of time region information supplied as an original signal into one or more pieces of sub-band data for each of a plurality of sub-bands to change the digital acoustic signal of the time region information to a digital acoustic signal of frequency region information;

combining the pieces of sub-band data of all sub-bands to produce a band combined signal as a first reproduced digital acoustic signal of the time region information;

producing a residual signal from the first reproduced digital acoustic signal of the time region information and the digital acoustic signal of the time region information as time region correcting information;

multiplexing the digital acoustic signal of the frequency region information and the time region correcting information to a bit stream;

demultiplexing the bit stream to separate the digital acoustic signal of the frequency region information from the time region correcting information;

combining the pieces of sub-band data of all sub-bands included in the digital acoustic signal of the frequency region information to produce a second reproduced digital acoustic signal of the time region information; and correcting the second reproduced digital acoustic signal of the time region information according to the time region correcting information demultiplexed.

In the above steps, the digital acoustic signal of the frequency region information and the time region correcting information multiplexed each other are demultiplexed, the second reproduced digital acoustic signal of the time region information is reproduced from the digital acoustic signal of the frequency region information, and the second reproduced digital acoustic signal of the time region information is corrected according to the time region correcting information.

Accordingly, because the acoustic signal is treated in the frequency region, redundancy caused by a deviation of a spectrum distribution of the acoustic signal can be effectively reduced regardless of types of acoustic signals produced from various audio sources. Also, because the residual signal is used as the time region correcting information to correct the second reproduced digital acoustic signal of the time region information, the digital acoustic signal can be reliably reproduced. Therefore, though various operations for strictly calculating a quantization precision of a frequency region signal required to maintain the reversibility are required in a conventional coding method in which any signal of the time region is not treated, any of the various operations is not required in the present invention.

The first object of the present invention is also achieved by the provision of an acoustic signal coding apparatus comprising:

a band dividing filter for dividing a digital acoustic signal of time region information supplied as an original signal into one or more pieces of sub-band data for each of a plurality of sub-bands to change the digital acoustic signal of the time region information to a digital acoustic signal of frequency region information;

a maximum value selecting unit for selecting a maximum value among the pieces of sub-band data divided by the band dividing filter for each of the sub-bands;

a bit allocating information producing unit for producing bit allocating information indicating the number of bits allocated to the pieces of sub-band data according to the maximum value selected by the maximum value selecting unit for each of the sub-bands;

a quantizing unit for reducing the number of bits used in each piece of sub-band data divided by the band dividing filter by a reducing number Nr according to the bit allocating information produced by the bit allocating information producing unit to produce the digital acoustic signal of the frequency region information composed of the pieces of sub-band data in which the number of bits is reduced by the reducing number Nr for each of the sub-bands;

an inversely quantizing unit for adding Nr bits having the same value as that of a sign bit of each piece of sub-band data to each piece of sub-band data in which the number of bits is reduced by the reducing number Nr by the quantizing unit;

a band combining filter for combining the pieces of sub-band data of all sub-bands to produce a band combined signal as a reproduced digital acoustic signal of time region information;

a residual signal producing unit for producing a residual signal from the digital acoustic signal of the time region information and the reproduced digital acoustic signal of the time region information produced by the band combining filter and outputting the residual signal as time region correcting information; and a multiplexing unit for multiplexing the digital acoustic signal of the frequency region information produced by the quantizing unit and the time region correcting information to produce a bit stream as an output signal.

In the above configuration, because the number of bits used in each piece of sub-band data is reduced in the quantizing unit, a volume of the digital acoustic signal of the frequency region information is reduced, and the digital acoustic signal of the frequency region information can be efficiently coded. Also, because the time region correcting information is multiplexed with the digital acoustic signal of the frequency region information, in cases where the time region correcting information is used in a decoding operation to correct a reproduced digital acoustic signal of the time region information, the reproduced digital acoustic signal of the time region information agreeing with the original signal can be reliably obtained while maintaining the reversibility.

The first object of the present invention is also achieved by the provision of an acoustic signal coding and decoding apparatus comprising:

a band dividing filter for dividing a digital acoustic signal of time region information supplied as an original signal into one or more pieces of sub-band data for each of a plurality of sub-bands to change the digital acoustic signal of the time region information to a digital acoustic signal of frequency region information;

a maximum value selecting unit for selecting a maximum value among the pieces of sub-band data divided by the band dividing filter for each of the sub-bands;

a bit allocating information producing unit for producing bit allocating information indicating the number of bits allocated to the pieces of sub-band data according to the maximum value selected by the maximum value selecting unit for each of the sub-bands;

a quantizing unit for reducing the number of bits used in each piece of sub-band data divided by the band dividing filter by a reducing number Nr according to the bit allocating information produced by the bit allocating information producing unit to produce the digital acoustic signal of the frequency region information composed of the pieces of sub-band data in which the number of bits is reduced by the reducing number Nr for each of the sub-bands;

a first inversely quantizing unit for adding Nr bits having the same value as that of a sign bit of each piece of sub-band data to each piece of sub-band data in which the number of bits is reduced by the reducing number Nr by the quantizing unit;

a first band combining filter for combining the pieces of sub-band data of all sub-bands produced by the first inversely quantizing unit to produce a band combined signal as a first reproduced digital acoustic signal of time region information;

a residual signal producing unit for producing a residual signal from the digital acoustic signal of the time region information and the first reproduced digital acoustic signal of the time region information produced by the first band combining filter and outputting the residual signal as time region correcting information;

a multiplexing unit for multiplexing the digital acoustic signal of the frequency region information produced by the quantizing unit and the time region correcting information to produce a bit stream as an output signal;

a demultiplexing unit for demultiplexing the bit stream produced by the multiplexing unit to separate the digital acoustic signal of the frequency region information from the time region correcting information;

a second inversely quantizing unit for adding Nr bits having the same value as that of a sign bit of each piece of sub-band data to each piece of sub-band data of the digital acoustic signal of the frequency region information demultiplexed by the demultiplexing unit;

a second band combining filter for combining the pieces of sub-band data of all sub-bands in the digital acoustic signal of the frequency region information produced by the second inversely quantizing unit to produce a second reproduced digital acoustic signal of the time region information; and a residual correcting unit for correcting the second reproduced digital acoustic signal of the time region information produced by the second band combining filter according to the time region correcting information demultiplexed by the demultiplexing unit to output a corrected digital acoustic signal of the time region information.

In the above configuration, the first reproduced digital acoustic signal of the time region information is produced from the digital acoustic signal of the frequency region information in the first quantizing unit and the first band combining filter. Also, the second reproduced digital acoustic signal of the time region information is produced from the same digital acoustic signal of the frequency region information in the second quantizing unit and the second band combining filter. Therefore, in cases where the configuration of the first quantizing unit and the first band combining filter is the same as that of the second quantizing unit and the second band combining filter, a round-off processing and a computing precision for the first reproduced digital acoustic signal of the time region information are the same as those for the second reproduced digital acoustic signal of the time region information, and the second reproduced digital acoustic signal of the time region information agrees with the first reproduced digital acoustic signal of the time region information.

Accordingly, because the second reproduced digital acoustic signal of the time region information is corrected according to the time region correcting information, the corrected digital acoustic signal of the time region information perfectly agrees with the digital acoustic signal of the time region information input as the original signal.

The second object of the present invention is achieved by the provision of an acoustic signal coding method, comprising the steps of:

receiving a digital acoustic signal of time region information as an original signal;

dividing the digital acoustic signal of time region information into one or more pieces of sub-band data for each of a plurality of sub-bands to change the digital acoustic signal of the time region information to a digital acoustic signal of frequency region information;

combining the pieces of sub-band data of all sub-bands to produce a band combined signal as a reproduced digital acoustic signal of time region information;

producing a residual signal composed of pieces of residual data from the digital acoustic signal of the time region information received as the original signal and the reproduced digital acoustic signal of the time region information as time region correcting information;

producing a piece of pulse data according to the residual signal to make a residual value of one piece of residual data of the residual signal approach an average value of the residual values in cases where the pulse data is added to the digital acoustic signal of time region information to again produce the residual signal;

adding the pulse data to the digital acoustic signal of time region information to produce an adjusted digital acoustic signal of frequency region information from the digital acoustic signal of time region information, produce an adjusted reproduced digital acoustic signal of time region information from the adjusted digital acoustic signal of frequency region information and producing an adjusted residual signal from the adjusted reproduced digital acoustic signal of time region information as adjusted time region correcting information; and multiplexing the digital acoustic signal of the frequency region information and the adjusted time region correcting information to produce a bit stream as an output signal.

In the above steps, a piece of pulse data is produced to make a residual value of a piece of particular residual data of the residual signal approach an average value of the residual values in cases where the residual signal is produced from the digital acoustic signal of time region information to which the pulse data is added, and the pulse data is added to the digital acoustic signal of time region information. Therefore, an adjusted residual signal in which a residual value of the piece of particular residual data approach an average value of the pieces of residual data is produced as adjusted time region correcting information.

Accordingly, because the residual values of the pieces of residual data of the adjusted residual signal approach the average value, the adjusted residual signal can be efficiently coded to reduce a coded information volume of the adjusted residual signal. Therefore, when the digital acoustic signal of the frequency region information and the adjusted time region correcting information are multiplexed to produce a bit stream as an output signal, a total amount of coded information in the output signal can be reduced on condition that an acoustic signal is efficiently coded while perfectly maintaining reversibility.

The second object of the present invention is also achieved by the provision of an acoustic signal coding apparatus, comprising:

a band dividing filter for dividing a digital acoustic signal of time region information supplied as an original signal into one or more pieces of sub-band data for each of a plurality of sub-bands to change the digital acoustic signal of the time region information to a digital acoustic signal of frequency region information;

a maximum value selecting unit for selecting a maximum value among the pieces of sub-band data divided by the band dividing filter for each of the sub-bands;

a bit allocating information producing unit for producing bit allocating information indicating the number of bits allocated to the pieces of sub-band data according to the maximum value selected by the maximum value selecting unit for each of the sub-bands;

a quantizing unit for reducing the number of bits used in each piece of sub-band data divided by the band dividing filter by a reducing number Nr according to the bit allocating information produced by the bit allocating information producing unit to produce the digital acoustic signal of the frequency region information composed of the pieces of sub-band data in which the number of bits is reduced by the reducing number Nr for each of the sub-bands;

an inversely quantizing unit for adding Nr bits having the same value as that of a sign bit of each piece of sub-band data to each piece of sub-band data in which the number of bits is reduced by the reducing number Nr by the quantizing unit;

a band combining filter for combining the pieces of sub-band data of all sub-bands produced by the inversely quantizing unit to produce a band combined signal as a reproduced digital acoustic signal of time region information;

a residual signal producing unit for producing a residual signal composed of pieces of residual data from the digital acoustic signal of the time region information and the reproduced digital acoustic signal of the time region information produced by the band combining filter;

a pulse data producing unit for producing a piece of pulse data according to the residual signal produced by the residual signal producing unit to make a residual value of a piece of residual data of the residual signal approach an average value of the residual values in cases where the pulse data is added to the digital acoustic signal of time region information to again produce the residual signal;

an acoustic signal adjusting unit for adding the pulse data produced by the pulse data producing unit to the digital acoustic signal of time region information to produce an adjusted digital acoustic signal of time region information and produce an adjusted residual signal from the adjusted reproduced digital acoustic signal of time region information as adjusted time region correcting information in the residual signal producing unit through the band dividing filter, the quantizing unit, the inversely quantizing unit and the band combining filter; and a multiplexing unit for multiplexing the digital acoustic signal of the frequency region information produced by the quantizing unit and the adjusted time region correcting information produced by the residual signal producing unit to produce a bit stream as an output signal.

In the above configuration, after the residual signal is produced in the residual signal producing unit, a piece of pulse data is produced in the pulse data producing unit to make a residual value of one piece of particular residual data of the residual signal approach an average value of the residual values in cases where the residual signal is produced from the digital acoustic signal of time region information to which the pulse data is added, and the pulse data is added to the digital acoustic signal of time region information by the acoustic signal adjusting unit. Therefore, an adjusted residual signal in which a residual value of the piece of particular residual data approach an average value of the pieces of residual data is produced as adjusted time region correcting information in the acoustic signal adjusting unit.

Accordingly, the adjusted residual signal can be efficiently coded to reduce a coded information volume of the adjusted residual signal.

BRIEF DESCRIPTION OF THE DRAWINGS

The objects, features and advantages of the present invention will be apparent from the following description taken in conjunction with the accompanying drawings, in which:

FIG. 1 is a block diagram of an acoustic signal coding apparatus according to a first embodiment of the present invention;

FIG. 2 shows a relationship between an allowable bit allocation number indicated by a bit number code and a maximum value M among the pieces of sub-band data for each sub-band;

FIG. 3 shows a relationship between a block bit width indicated by a bit number code and a maximum value M among a plurality of samples in a residual signal;

FIG. 5 is an example of a bit reducing operation performed for each piece of sub-band data;

FIG. 6 is a block diagram of a digital signal processor used in a band combining filter shown in FIG. 1;

FIGS. 7(a) to 7(d) show an inherent delay of each of a band dividing filter and a band combining filters shown in FIG. 1;

FIG. 13A shows pieces of residual data of a residual signal having various amplitude values as an example;

FIG. 13B shows pieces of reproduced pulse data composed of a piece of pulse data and noises;

FIG. 13C shows an adjusted residual signal obtained by overlapping the residual signal shown in FIG. 13A with the reproduced pulse data shown in FIG. 13B;

DETAILED DESCRIPTION OF THE EMBODIMENTS

Figure 4:
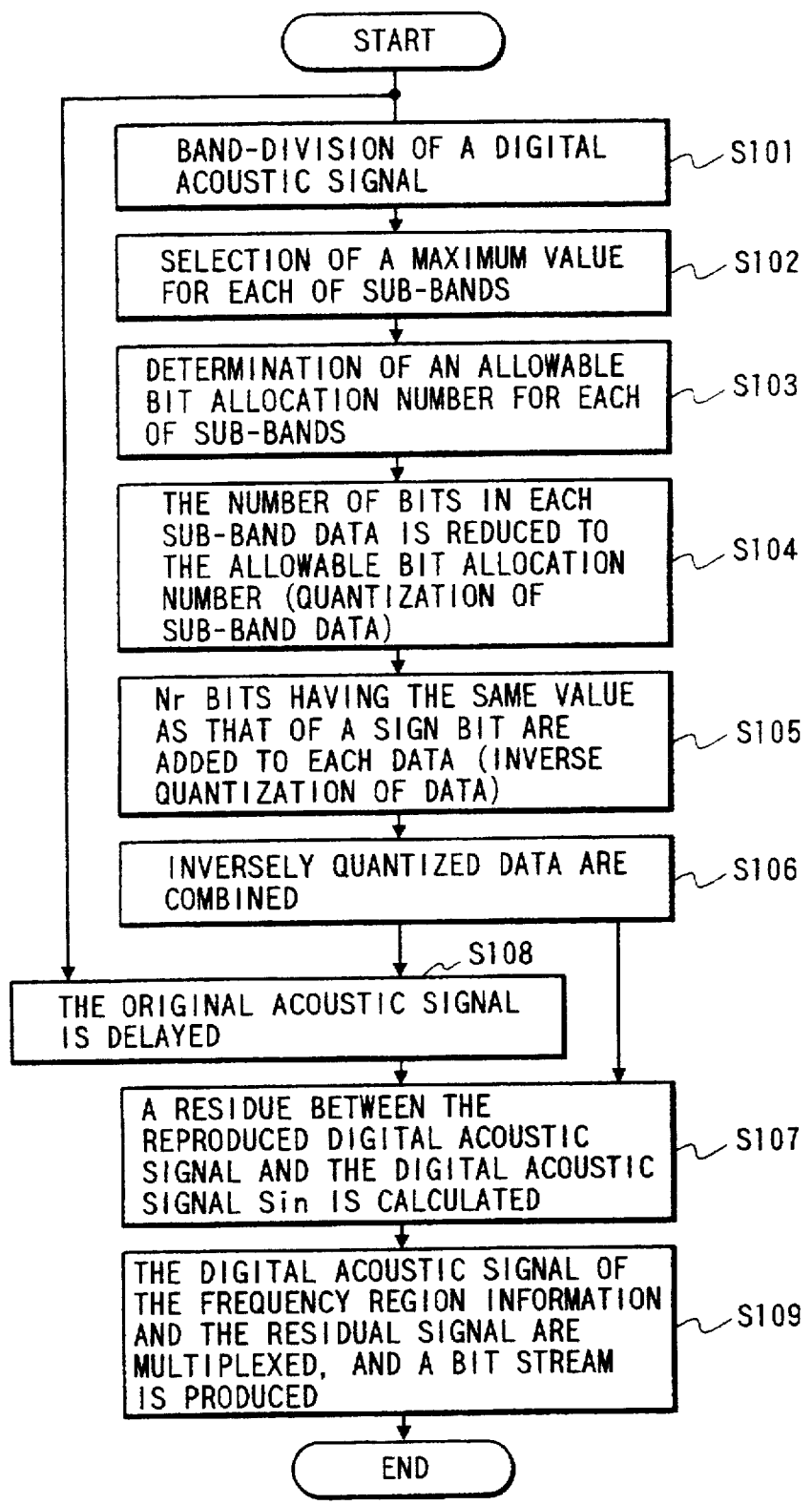
FIG. 4 is a flow chart showing an operation in the acoustic signal coding apparatus shown in FIG. 1.

Preferred embodiments of acoustic signal coding method and apparatus and acoustic signal decoding method and apparatus according to the present invention are described with reference to drawings.

FIG. 1 is a block diagram of an acoustic signal coding apparatus according to a first embodiment of the present invention.

As shown in FIG. 1, an acoustic signal coding apparatus 11 comprises a frequency region information producing unit 12 for receiving a plurality of frames of digital acoustic signals frame by frame and producing frequency region information from a current frame of digital acoustic signal Sin (or an original acoustic signal Sin), a time region information producing unit 13 for producing time region correcting information from the current frame of digital acoustic signal Sin and the frequency region information, and a multiplexing unit 14 for multiplexing the frequency region information and the time region correcting information.

The frequency region information producing unit 12 comprises a band dividing filter 15 for dividing a plurality of samples included in the current frame of digital acoustic signal Sin into a plurality of sub-band groups and outputting one or more pieces of sub-band data for each of the sub-bands, a maximum value selecting unit 16 for selecting a maximum value S among energy values (or amplitude values) of the pieces of sub-band data supplied from the band dividing filter 15 for each of the sub-bands, a bit number determining unit 17 for determining an allowable bit allocation number in each of the pieces of sub-band data according to the maximum number S, and a quantizing unit 18 for quantizing the pieces of sub-band data output from the band dividing filter 15 by reducing the number of bits allocated to each of the pieces of sub-band data to the allowable bit allocation number for each of the sub-bands and producing pieces of quantized data as the frequency region information.

The time region information producing unit 13 comprises an inversely quantizing unit 19 for inversely quantizing the pieces of quantized data transmitted from the quantizing unit 18 for each sub-band, a band combining filter 20 for combining pieces of inversely quantized data obtained in the inversely quantizing unit 19, a delaying unit 21 for delaying the current frame of digital acoustic signal Sin by a predetermined delaying time, and a residual calculating unit 22 for calculating a residual signal from a difference between the current frame of digital acoustic signal Sin delayed by the delaying unit 21 and a band combining signal obtained in the band combining filter 20 as the time region correcting information.

A plurality of frames of digital acoustic signals Sin are input to the producing units 12 and 13 frame by frame. In this embodiment, each frame of digital acoustic signal Sin has, for example, 512 samples per a channel, and a band division width in the band dividing filter 15 is set to divide each frame of digital acoustic signal Sin to 32 bands.

A least significant bit precision is fixed to an arbitrary bit width. In this embodiment, 16-bit fixed quantization precision is adopted, and information lower than the 16-bit fixed quantization precision is rounded off to reflect the information on an upper bit (16-th bit equivalent to a least significant bit). Bit allocating information of a frequency region expresses a plurality of bit number codes ranging from 0 to 16 by using 4 bits for the bit allocating information, and bit allocating information of a time region expresses a plurality of bit number codes ranging from 0 to 8 by using 3 bits for the bit allocating information. The bit number code indicates the number of bits allowed to be allocated to each of the pieces of quantized data produced as the frequency region information in the quantizing unit 18.

Here, a bit allocating width of the time region is determined by the band combining filter 20. That is, the bit allocating width depends on the number of multiplication operations performed in the band combining filter 20. In cases where a worst value of a sum of computing errors in the band combining filter 20 is within the time allocating bit width, a final quantization precision is guaranteed by the bit allocating width of the frequency region. In this embodiment, because bit allocating information of the time region expresses a plurality of bit number codes by using 3 bits, the 16-bit quantization precision is guaranteed. Also, in cases where a bit allocating width is expressed by 4 bits, the digital acoustic signal Sin having 24-bit quantization precision can be reversibly compressed. However, in this case, because the time region information is increased and a coding quality deteriorates, it is required that a ratio of the digital acoustic signal Sin of the time region information and the digital acoustic signal Sin of the frequency region information is appropriately set.

An allowable bit allocation number applied for the digital acoustic signal Sin of the frequency region information in the quantizing unit 18 is shown in FIG. 2 in which a relationship between a bit number code indicating the allowable bit allocation number and a maximum value M among energy values of the pieces of sub-band data for each sub-band is listed. Also, an allowable bit allocation number applied for a residual signal in the residual calculating unit 22 is shown in FIG. 3 in which a relationship between a block bit width (denoting an allowed bit number in each sample of the residual signal) and a maximum value M among values of a plurality of samples in the residual signal is listed. In FIGS. 2 and 3, no bit application is set by a bit number code "0". In cases where bit allocation information indicates an allowable bit allocation number, the allowable bit allocation number is set by the bit number codes ranging from 2 to a maximum number (16 or 8).

An operation in the acoustic signal coding apparatus 11 is described with reference to FIG. 4.

FIG. 4 is a flow chart showing an operation in the acoustic signal coding apparatus 11.

A current frame of digital acoustic signal Sin (or original signal) denoting information in a time region is supplied to the band dividing filter 15 and the delaying unit 21. In the band dividing filter 15, the digital acoustic signal Sin of the time region information is developed to a digital acoustic signal denoting information in a frequency region (step S101). That is, a plurality of samples of the digital acoustic signal Sin are equally divided into 32 sub-bands in the band dividing filter 15, and a sub-band width W is set as follows.
W=(sampling frequency 0.5)/32 (Hz)

In this case, a precision of sub-band data output from the band dividing filter 15 is the 16-bit fixed quantization precision equivalent to the least significant bit precision described before.

Also, a filter such as a discrete cosine transformation (DCT) in which an orthogonal conversion is performed, a sub-band filter in which a principle of a filter is used, a wavelet transformation in which a signal is divided into a plurality of base waveforms and is expressed and a Fourier transformation known as a representative method of a frequency conversion are used for the band dividing filter 15 and the band combining filter 20. Also, in the present invention, because the time region information is used in addition to the frequency region information, when an original acoustic signal is processed in the filters 15 and 20 to obtain a processed signal, it is not required that the processed signal perfectly agrees with the original acoustic signal, so that any of the frequency converting methods can be used. In this embodiment, a sub-band filter (or a poliphase filter) having 512 taps is used. Also, a delay time occurring because of the division and combination performed in the filters 15 and 20 is equivalent to a transmission period for 480 samples.

Thereafter, the digital acoustic signal of the frequency region information equally divided in the band dividing filter 15 is supplied to the maximum value selecting unit 16 and the quantizing unit 18.

In the maximum value selecting unit 16, 16 (=512/32) pieces of sub-band data are received for each of the 32 sub-bands, absolute values of the 16 pieces of sub-band data are compared with each other, a piece of particular sub-band data having a maximum absolute value is selected, and the particular sub-band data having a maximum value S is output (step S102) for each of the 32 sub-bands.

Thereafter, the maximum value S of the particular sub-band data output from the maximum value selecting unit 16 is supplied to the bit number determining unit 17 for each of the 32 sub-bands. In the bit number determining unit 17, an allowable bit allocation number in each piece of sub-band data is determined from the maximum value S for each sub-band while referring the relationship between an allowable bit allocation number in each of pieces of sub-band data of the digital acoustic signal Sin and a maximum value M among the pieces of sub-band data in FIG. 2 (step S103). In this case, the allowable bit allocation number for each sub-band is determined to a minimum bit number required to express the particular sub-band data (or a maximum value sample) by a twos complement expression.

In the quantizing unit 18, the number of bits in each of the pieces of sub-band data of the digital acoustic signal Sin of the frequency region information supplied from the band dividing filter 15 is reduced to the allowable bit allocation number according to the bit allocating information supplied from the bit number determining unit 17 (step S104). In this bit number reducing operation, upper bits of each piece of sub-band data except a sign bit placed at the uppermost position are removed. The number of removed upper bits is equal to (16—the allowable bit allocation number), and the allowable bit allocation number is listed in FIG. 2. An example of the bit reducing operation performed for each piece of sub-band data is shown in FIG. 5.

As shown in FIG. 5, in cases where values of a plurality of pieces of sub-band data expressed according to a decimal notation are 6,31,84,--,-94,--,54, a maximum value S is -94, and the allowable bit allocation number indicated by the bit allocation information is set to 8 bits according to the relationship shown in FIG. 2. Therefore, 8 upper bits except a sign bit are removed as removed bits from each piece of sub-band data having 16 bits according to a binary notation, each of pieces of quantized data respectively composed of the sign bit and 7 lower bits of one piece of sub-band data is transmitted to the inversely quantizing unit 19. In this case, a binary value of each reduced bit is equal to that of the sign bit. Therefore, in cases where the number Nr of reduced bits are obtained from the bit allocation information and Nr pieces of bits having the same binary value as that of the sign bit are added to each piece of quantized data as upper bits in an inverse quantization performed in the inversely quantizing unit 19, the pieces of sub-band data can be reproduced.

Thereafter, the pieces of quantized data and the pieces of bit allocating information are transmitted to the multiplexing unit 14. Also, the pieces of quantized data and the pieces of bit allocating information are transmitted to the inversely quantizing unit 19.

In the inversely quantizing unit 19, the number Nr=(16-the allocated bit number) of reduced bits are obtained from the bit allocation information, and Nr bits having the same binary value as that of the sign bit are added to each piece of quantized data as upper bits (step S105) to produce a piece of inversely quantizing data for each sub-band. Accordingly, because any arithmetical operation is not performed in the quantizing unit 18 or the inversely quantizing unit 19, any round-off operation is performed, so that any quantization error does not occurs.

Thereafter, the pieces of inversely quantized data having the same least significant bit precision (in this embodiment, the 16-bit fixed quantization precision) are supplied to the band combining filter 20, and the pieces of inversely quantized data are combined each other and are converted to a band combined signal of time region information (step S106). In the band combining filter 20, a band combining process is performed on condition that a computing precision, a filter coefficient precision and a round-off operation for data in the intermediate of calculation and data output from an output stage are the same as those in a band combining filter of a acoustic signal decoding apparatus.

In general, a digital signal processor is often used for a digital acoustic signal operation. Therefore, the band combining process performed in the band combining filter 20 is described on condition that the band combining filter 20 has the digital signal processor.

FIG. 6 is a block diagram of the digital signal processor used in the band combining filter 20. In the digital signal processor, a fixed-point of 16 bits*16 bits is, for example, used, and an internal computing precision and a data width in a memory are set to 16 bits.

In the band dividing and combining process performed in a sub-band filter, data is converted according to a product-sum arithmetic operation. Therefore, the band dividing filter 15 is composed of a multiplier, an adder and registers placed in input and output stages, and those elements are connected with memories for storing various coefficients required for various calculations, memories for storing intermediate data, an input bus and an output bus.

As shown in FIG. 6, the pieces of inversely quantized data are temporarily stored in a memory (not shown) with a 16-bit precision and are input to a multiplier 31 through a 16-bit input data bus one by one. Also, pieces of filter coefficient data are temporarily stored in a coefficient memory (not shown) with a 16-bit precision and are input to a multiplier 31 through another 16-bit input data bus one by one. In the multiplier 31, each piece of inversely quantized data is multiplied with a piece of corresponding filter coefficient data, and pieces of 32-bit multiplied data are output to an adder 32 one by one through a 32-bit data bus. In the adder 32, a piece of data having (32+α) bits is treated. The α bits denote upper extended bits. An output of the adder 32 is temporarily stored in a register 33 through another 32-bit data bus, the output of the adder 32 and a piece of next multiplied data output from the multiplier 31 are added each other in the adder 32, and the output of the adder 32 is stored in the register 33. A first-stage product-sum arithmetic operation performed in the adder 32 and the register 33 is repeated until all pieces of inversely quantized data are input to the multiplier 31 and the adder 32.

When one of the first-stage product-sum arithmetic operations is finished, a piece of 32-bit summed data having a 32-bit precision is transmitted from the adder 32 to a register 34. In the register 34, the 32-bit summed data is round off to produce a piece of 16-bit arithmetic data having a 16-bit precision, and each of the pieces of 16-bit arithmetic data is temporarily stored in an arithmetic memory (not shown) and is output to the multiplier 31 to perform a second-stage product-sum arithmetic operation. When the second-stage product-sum arithmetic operation is finished for each of the pieces of 16-bit arithmetic data, a band combined signal having a 16-bit precision is output from the register 34 to the residual calculating unit 22 as data of time region information.

In this case, because input data of the 16-bit precision is converted to output data of the 32-bit precision in the multiplier 31, any computing error does not occur. Also, because the upper extended bits are prepared in the adder 32, the number of bits in an integral region of data processed in the adder 32 is sufficient. Therefore, any over flow or under flow does not occurs in the adder 32. Also, because a round-off operation is performed when the data are stored in the memory and the band combined signal is obtained, any excessive computing errors are not accumulated.

After the band combining operation is performed in the band combining filter 20, the band combined signal of the time region information output from the band combining filter 20 is input to the residual calculating unit 22 as a reproduced digital acoustic signal, and the digital acoustic signal (or original acoustic signal) delayed in the delaying unit 21 is input to the residual calculating unit 22. In the residual calculating unit 22, the computing error occurring in the band dividing unit 15 and the band combining unit 20 is obtained by calculating a difference between the reproduced digital acoustic signal and the digital acoustic signal Sin of the time region information, and the computing error is output as a residual signal (step S107).

Here, the residual signal is treated as a block of 16 samples, and a minimum bit number required to express a maximum value M in the 16 samples of the block is called a block bit width, and the block bit width is expressed by a bit number code expressed by using 3 bits. A relationship between the block bit width and the maximum number M in the residual signal is shown in FIG. 3. As shown in FIG. 3, the block bit width in each sample is determined according to the maximum value M.

Also, because the reproduced acoustic signal passing through the band dividing filter 15 and the band combining filter 20 is delayed according to an inherent delay of each of the filters 15 and 20, the original acoustic signal is delayed in the delaying unit 21 (step S108). Therefore, the original acoustic signal and the reproduced acoustic signal produced from the same original acoustic signal are simultaneously supplied to the residual calculating unit 22. The inherent delay of each of the filters 15 and 20 is described in brief with reference to FIGS. 7(a) to 7(d).

Figure 16:
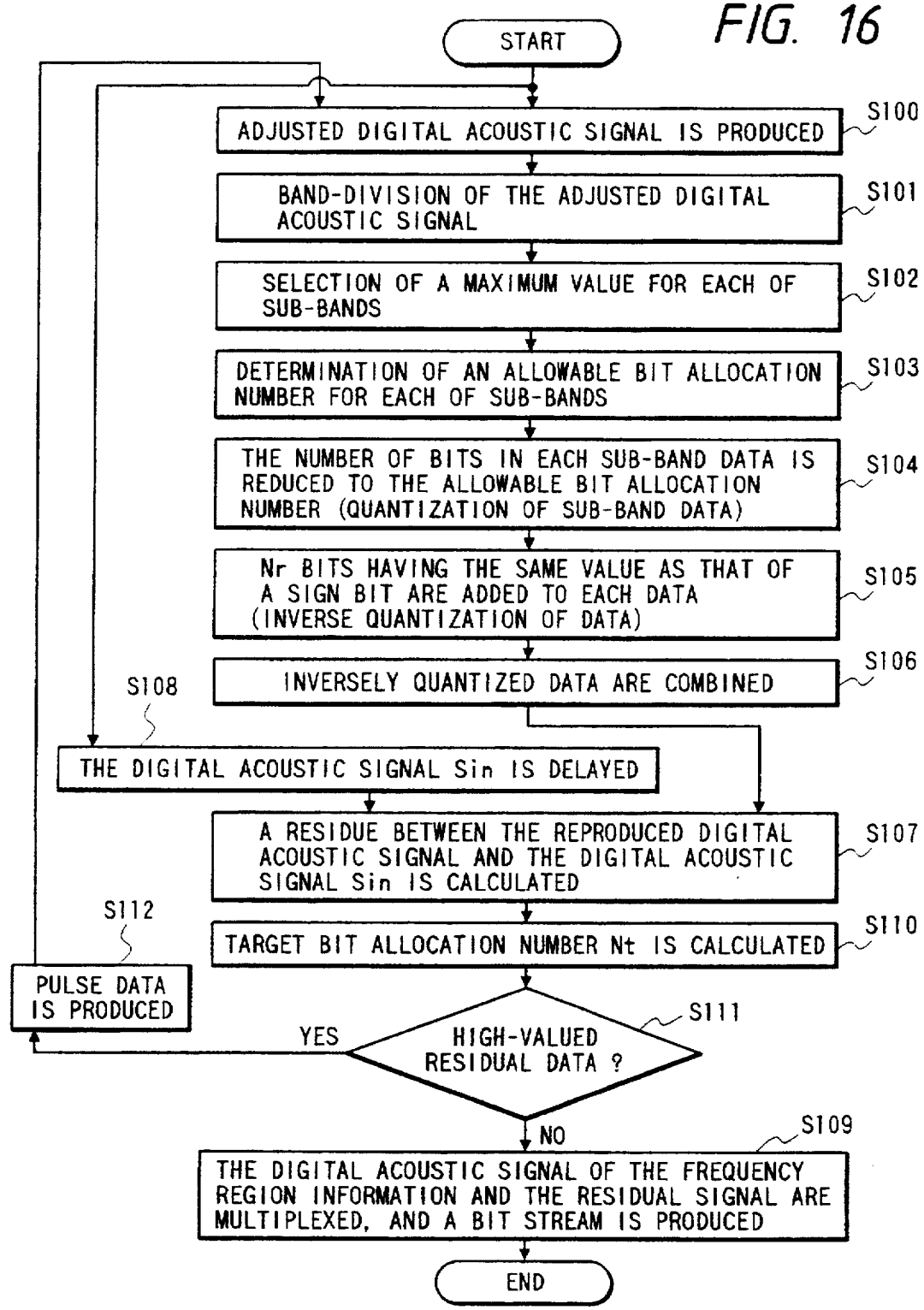
FIG. 16 is a flow chart showing a coding operation performed in the digital acoustic signal coding apparatus shown in FIG. 15.

When a plurality of frames of digital acoustic signals (or original acoustic signals) Sin of the time region information are supplied to the band dividing filter 15 frame by frame, as shown in FIG. 7(a), 16 samples of a current frame of original acoustic signal are stored one by one in the band dividing filter 15 for each of 32 sub-bands while shifting the samples previously stored in the band dividing filter 15. That is, 32 samples of the 32 sub-bands are stored in the band dividing filter 15 every sampling time while shifting each group of 32 samples previously stored, and a group of 32 pieces of sub-band band data is produced every sampling time (FIG. 7(b)). Thereafter, each group of 32 pieces of sub-band data is stored in the band combining filter 20 every sampling time while shifting each group of 32 pieces of sub-band data previously stored, and a group of 32 output signals (or a reproduced acoustic signal of the time region information) is produced every sampling time in the band combining unit 20 (FIG. 7(c)). In this case, the delay occurring in a series of operations performed in the band dividing filter 15 and the band combining filter 20 is equivalent to 480 samples (512–32), and the reproduced acoustic signal delayed by a time of 480 samples is output to the residual calculating unit 22. Therefore, the original acoustic signal is delayed in the delaying unit 21 by a time of 480 samples to cancel the inherent delay of each of the filters 15 and 20 (FIG. 7(d)), and the residual signal can be calculated from the reproduced acoustic signal and the original acoustic signal.

Figure 8:
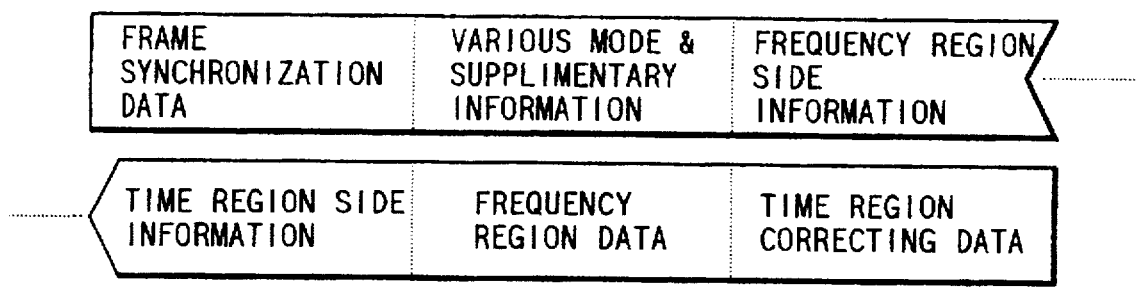
FIG. 8 shows an example of a bit stream output from the acoustic signal coding apparatus shown in FIG. 1.

Thereafter, in the multiplexing unit 14, a frame synchronization word, various modes and supplementary information, supplementary information for a frequency region signal (frequency region side information), supplementary information for a time region signal (time region side information) and the like are coded and added to the pieces of quantized data equivalent to the digital acoustic signal of the frequency region information (called frequency region data), in which the number of bits is reduced, supplied from the quantizing unit 12 and the residual signal (called time region correcting data) supplied from the residual calculating unit 22, and a frame of bit stream shown in FIG. 8 is produced (step S109).

Accordingly, because the quantized data equivalent to the digital acoustic signal of the frequency region information and the residual signal are multiplexed in the frame of bit stream, a delaying time occurring in the quantized data when the quantized data are band-combined in a decoding operation to reproduce the digital acoustic signal of the time region information can be decreased.

Next, an embodiment of acoustic signal decoding method and apparatus is described.

Figure 9:
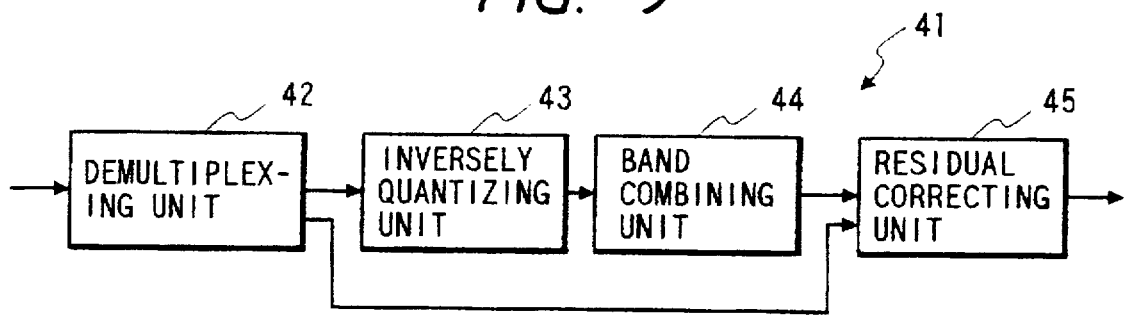
FIG. 9 is a block diagram of an acoustic signal decoding apparatus according to a second embodiment of the present invention.
Figure 10:
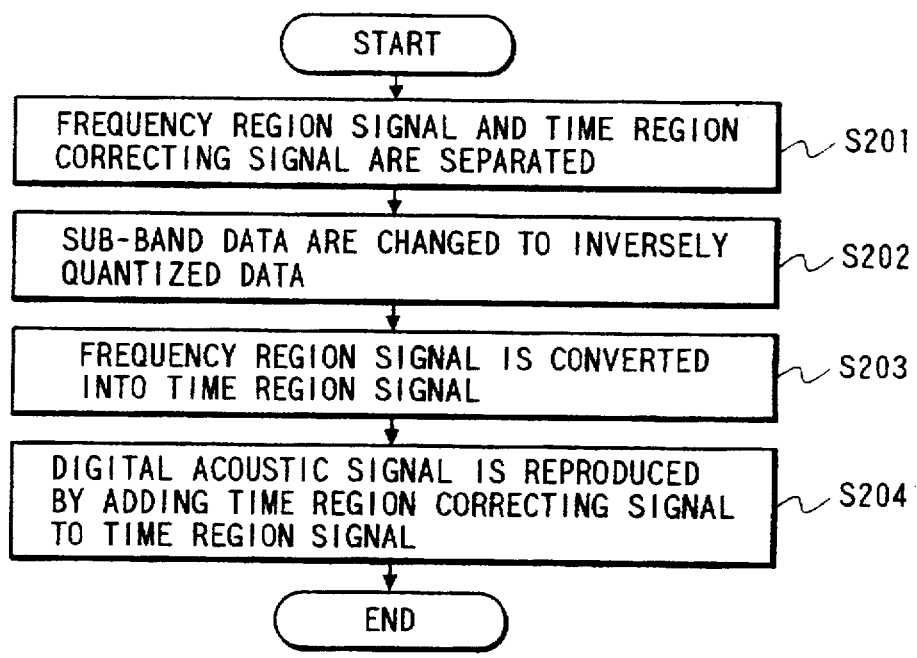
FIG. 10 is a flow chart of an acoustic signal decoding operation performed in the acoustic signal decoding apparatus shown in FIG. 9.

FIG. 9 is a block diagram of an acoustic signal decoding apparatus according to a second embodiment of the present invention, and FIG. 10 is a flow chart of an acoustic signal decoding operation performed in the acoustic signal decoding apparatus shown in FIG. 9.

As shown in FIG. 9, an acoustic signal decoding apparatus 41 comprises
- a demultiplexing unit 42 for decoding the frame synchronization word, the various modes, the supplementary information, the supplementary information and the like included in the bit stream and demultiplexing a frequency region signal indicating the frequency region data and a time region correcting signal indicating the time region correcting data from the bit stream,
- an inversely quantizing unit 43 having the same configuration as that of the inversely quantizing unit 19 for inversely quantizing each of pieces of quantized data of the frequency region signal by adding a plurality of bits having the same value as that of a sign bit of each piece of quantized data to an upper place of each piece of quantized data,
- a band combining filter 44 having the same configuration as that of the band combining filter 20 for combining the quantized data divided into the sub-bang groups to convert the frequency region signal into time region signal, and
- a residual correcting unit 45 for correcting the time region signal according to the time region correcting signal demultiplexed in the demultiplexing unit 42.

In the above configuration, when the bit stream coded in the acoustic signal coding unit 11 is input to the demultiplexing unit 42, the frame synchronization word, the various modes, the supplementary information, the supplementary information and the like included in the bit stream are decoded and demultiplexed, and a frequency region signal and a time region correcting signal in the bit stream are separated from each other (step S201). The frequency region signal is supplied to the inversely quantizing unit 43, and the time region correcting signal is supplied to the residual correcting unit 45.

In the inversely quantizing unit 43, the number Nr=(16 the allocated bit number) is determined according to the bit allocating information bits for each sub-band. Nr bits having the same binary value as that of each sign bit of pieces of quantized data of the frequency region signal are added to an upper place of each of the pieces of quantized data, and a group of pieces of inversely quantized data of the frequency region signal is output from the inversely quantizing unit 43 for each sub-band (step S202).

Thereafter, the frequency region signal output from the inversely quantizing unit 43 is supplied to the band combining filter 44, and the frequency region signal is converted into a time region signal (step S203). In this case, because the processing performed for the frequency region signal in the inversely quantizing unit 43 and the band combining filter 44 is perfectly the same as that in the inversely quantizing unit 19 and the band combining filter 20 of the acoustic signal coding unit 11, in cases where an error occurring in the time region signal produced from the frequency region signal in the decoding processing of the inversely quantizing unit 43 and the band combining filter 44 is corrected according to the residual signal supplied from the acoustic signal coding unit 11 as the time region signal, the time region signal corrected in the acoustic signal decoding apparatus 41 can be agree with the original acoustic signal Sin input to the acoustic signal coding unit 11.

Therefore, the time region correcting signal (or the residual signal) supplied from the demultiplexing unit 42 is added in the residual correcting unit 45 to the time region signal supplied from the band combining filter 44, and a digital acoustic signal agreeing with the original acoustic signal Sin is reproduced (step S204).

In this case, a delay occurring in the band combining processing performed in the band combining filter 44 is compensated in the acoustic signal coding unit 11, so that the residual signal functioning as the time region correcting signal) and the time region signal obtained in the band combining filter 44 are supplied to the residual correcting unit 45 on condition that the residual signal and the time region signal are produced from the same original acoustic signal Sin. That is, because the residual signal is produced from the reproduced acoustic signal passing through the band dividing filter 15 and the band combining filter 20 and the original acoustic signal Sin delayed in the delaying unit 21, the residual signal is delayed by a time of 480 samples. However, because the frequency region signal does not pass through the band combining filter 20, a delay time for the frequency region signal is lower than that of the residual signal in the multiplexing unit 14 of the acoustic signal coding apparatus 11. Therefore, when the frequency region signal is delayed in the band combining filter 44 of the acoustic signal decoding apparatus 41, a delay time for the frequency region signal agrees with that of the residual signal in the residual correcting unit 45.

As a result, an acoustic decoded signal perfectly agreeing with the original acoustic signal Sin can be reliably reproduced in the acoustic signal decoding apparatus 41.

Accordingly, because the digital acoustic signal Sin is treated in the frequency region, redundancy caused by a deviation of a spectrum distribution of the digital acoustic signal Sin can be effectively reduced regardless of types of acoustic signals produced from various audio sources. Also, because the residual signal produced in the residual signal calculating unit 22 is used as the time region correcting information to correct the time region signal obtained in the band combining filter 44, the digital acoustic signal Sin can be reliably reproduced. Therefore, though various operations for strictly calculating a quantization precision of a frequency region signal required to maintain the reversibility are required in a conventional coding method in which any signal of the time region is not treated, any of the various operations is not required in the present invention.

Next, an acoustic signal coding method and an acoustic signal coding apparatus according to a second concept of the present invention is described.

In the second concept, values of pieces of residual data of the residual signal are adjusted to make the values of pieces of residual data approach an average value of the residual data for the purpose of efficiently coding the digital acoustic signal Sin. Here, each piece of residual data denotes a difference between a sample of the digital acoustic signal Sin and a piece of band combined data included in the band combined signal produced in the band combining filter 20.

Figure 11:
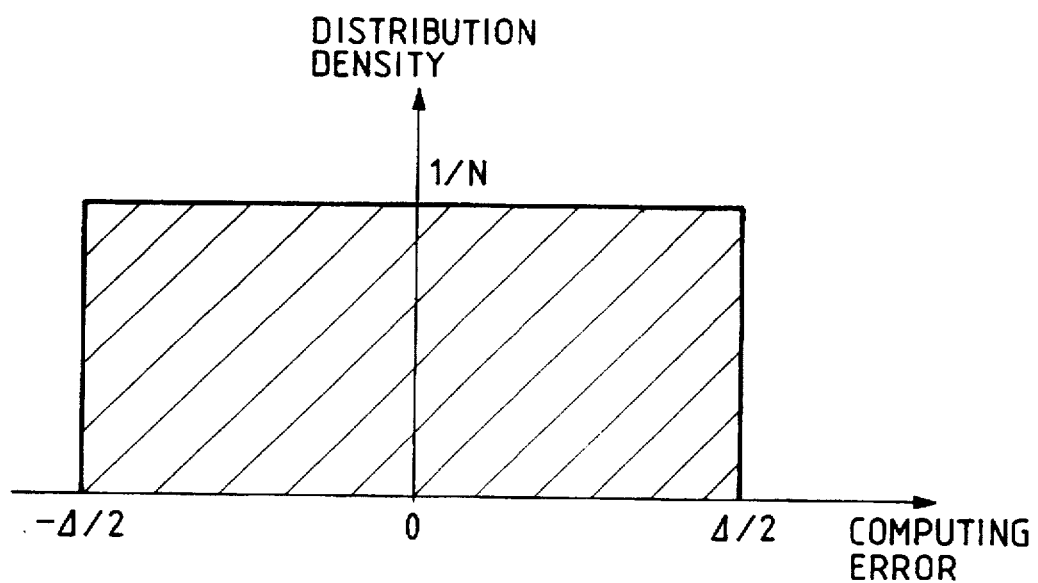
FIG. 11 shows a probability distribution of computing errors of N samples according to a probability-statistical theory.
Figure 12:
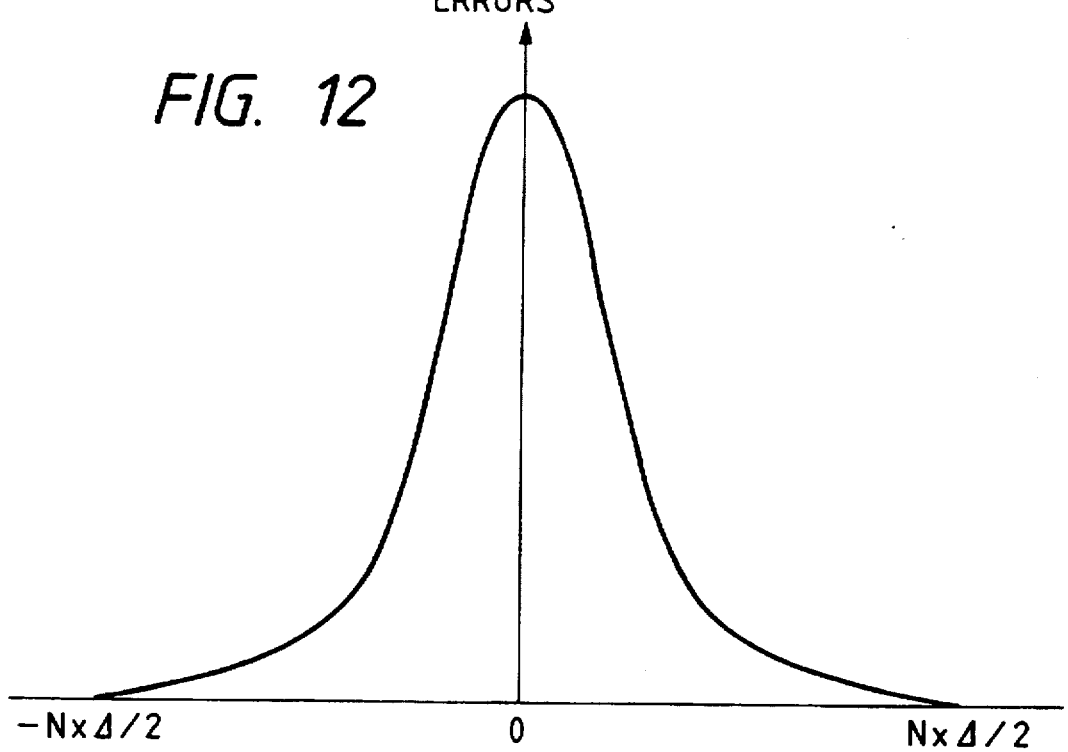
FIG. 12 shows a probability distribution of computing errors in cases where the addition is repeated N times.

In a first concept of the present invention shown in FIGS. 1 to 10, the pieces of residual data of the residual signal of the time region coded in the coding apparatus 11 are caused by computing errors occurring in the band combining operation performed in the band combining filter 20. In a probability-statistical theory, as shown in FIG. 11, in cases where one multiplication is performed at a quantization step width $\Delta$, the computing errors are uniformly distributed in a range from $-\Delta/2$ to $+\Delta/2$. Also, the addition of data in which the computing errors are included is repeated N times, as shown in FIG. 12, the computing errors finally included in the data are distributed in a range from $-N*\Delta/2$ to $+N*\Delta/2$ according to a normal distribution. The computing errors have no relation to the digital acoustic signal Sin, and a total volume of the residual signal is proportional to a total volume of calculations. In an information theory, a coding information volume determined according to a Shannon theorem has an upper limit, and an upper limit of an information volume of coded time region information is equal to the total volume of the residual signal.

For example, in cases where the pieces of residual data of the residual signal have almost the same amplitude value and a difference between an average amplitude value of the residual data and a maximum allowable amplitude value determined by the block bit width (the allowable bit allocation number) shown in FIG. 3 is low, a total coding information volume approaches a total information volume of the residual signal, so that the coding is effectively performed.

In contrast, in cases where one or more pieces of particular residual data having a considerably high absolute value exist in the residual signal to enlarge a standard deviation of a computing error distribution, it is required to increase the number of bits allocated to each piece of residual data for the purpose of expressing values of the pieces of particular residual data. In this case, because any information is not included in upper bits of each piece of other residual data, a coding information volume of the residual signal becomes considerably higher than that required by the computing errors, an information volume of the time region is undesirably increased, so that there is a case that the coding cannot be efficiently performed in the coding apparatus 11. Therefore, as the number of additions performed in the band combining filter 20 is increased, a standard deviation of a distribution of the residual data is enlarged, and a coding efficiency is decreased.

To improve the coding efficiency in the coding apparatus 11, it is preferred to make a maximum allowable amplitude value determined for the residual signal by the block bit width (the allowable bit allocation number) shown in FIG. 3 approach an average amplitude value of the pieces of residual data in the residual signal. That is, even though the average amplitude value is high, in cases where the maximum allowable amplitude value is lowered, the number of bits allocated to each piece of residual data can be reduced, and the coding efficiency can be improved.

Therefore, in the second concept of the present invention, the pieces of residual data of the residual signal are analyzed to make each of values of the pieces of residual data approach an average value of the pieces of residual data.

In detail, the computing errors caused by a round-off or the like cannot be predicted because indeterminate elements are included in the computing errors. Assuming that any error is not included in input data or coefficient data required for calculation, the computing errors are caused by rounding off information lower than a computing precision to guarantee the computing precision in a multiplication.

To efficiently code the time region correcting information, an average value of amplitude values of the pieces of residual data is calculated, and the number of bits allocated to each piece of residual data is determined according to the average value.

For example, in cases where pieces of residual data of a residual signal have amplitude values shown in FIG. 13A, it is required to allocate 7 bits to a piece of particular residual data having a maximum value for the purpose of expressing the particular residual data. Therefore, it is requited to set the number of bits allocated to each of pieces of other residual data to 7 (bits). However, in cases where the maximum value of the particular residual data is decreased to express the particular residual data by 6 bits, the number of bits allocated to each of pieces of other residual data can be reduced to 6 (bits).

To decrease the maximum value of the particular residual data, the maximum value is adjusted, a piece of pulse data of which a pulse value is obtained by inverting a sign of the adjusted maximum value is added to a particular sample of the digital acoustic signal Sin relating to the particular residual data to produce an adjusted digital acoustic signal Sad, and an adjusted residual signal is produced from the adjusted digital acoustic signal Sad by performing a frequency conversion and an inverse conversion for the adjusted digital acoustic signal Sad. That is, pieces of reproduced pulse data shown in FIG. 13B are obtained by processing the pulse data in the band dividing filter 15, the quantizing unit 18, the inversely quantizing unit 19 and the band combining filter 20, and an adjusted residual signal shown in FIG. 13C is obtained by overlapping the residual signal shown in FIG. 13A with the reproduced pulse data shown in FIG. 13B.

The change of the pulse data to the reproduced pulse data is described.

Figure 14A:
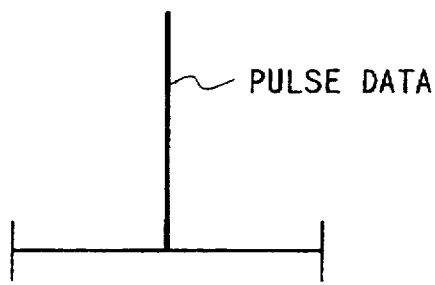
FIG. 14A shows a piece of pulse data of which a pulse value is not inverted.
Figure 14B:
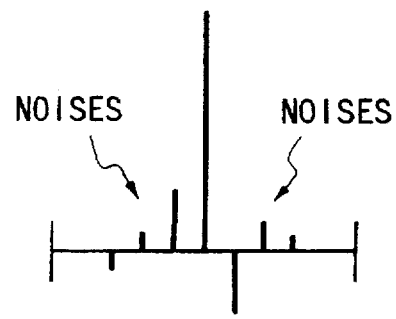
FIG. 14B shows the pulse data and noises placed around the pulse data obtained by reproducing the pulse data.

When a piece of pulse data, of which a pulse value is not inverted, shown in FIG. 14A is developed to the frequency region and is again developed to the time region, as shown in FIG. 14B, a plurality of noises are produced around the position of the pulse data because of computing errors caused by dispersion or quantization. Therefore, when the pulse data of which a pulse value is obtained by inverting a sign of the adjusted maximum value is added to the particular sample of the digital acoustic signal Sin and a frequency conversion and an inverse conversion are performed for the adjusted digital acoustic signal Sad, the adjusted residual signal shown in FIG. 13C is obtained. In this case, because values of the noises shown in FIG. 14B are very low as compared with the pulse value of the pulse data, any influence of the values is not exerted on other samples of the adjusted digital acoustic signal Sad.

Also, in cases where absolute values of a plurality of pieces of particular residual data are considerably high, the absolute values of a plurality of pieces of particular residual data are decreased according to one of two methods. In a first method, one of the values of the particular residual data is decreased each time the addition of a piece of pulse data to a particular sample of the digital acoustic signal Sin and the processing for the adjusted digital acoustic signal Sad are performed. Therefore, even though a plurality of pieces of particular residual data exist in the residual signal, the values of the particular residual data can be decreased by repeating the production of the adjusted residual signal shown in FIG. 13C. Also, in a second method, the number of bits allocated in the residual calculating unit 22 is set to a particular bit number Nb in advance according to the pieces of residual data of the residual signal on condition that the absolute values of the pieces of particular residual data exceed an upper limit expressed by Nb bits, a plurality of pieces of pulse data are added to a plurality of samples of the digital acoustic signal Sin relating to the pieces of particular residual data at one time, and the frequency conversion and the inverse conversion are performed for the adjusted digital acoustic signal Sad to produced the adjusted residual signal in which the absolute values of the pieces of particular residual data do not exceed the upper limit. In a following embodiment, the first method is adopted.

Figure 15:
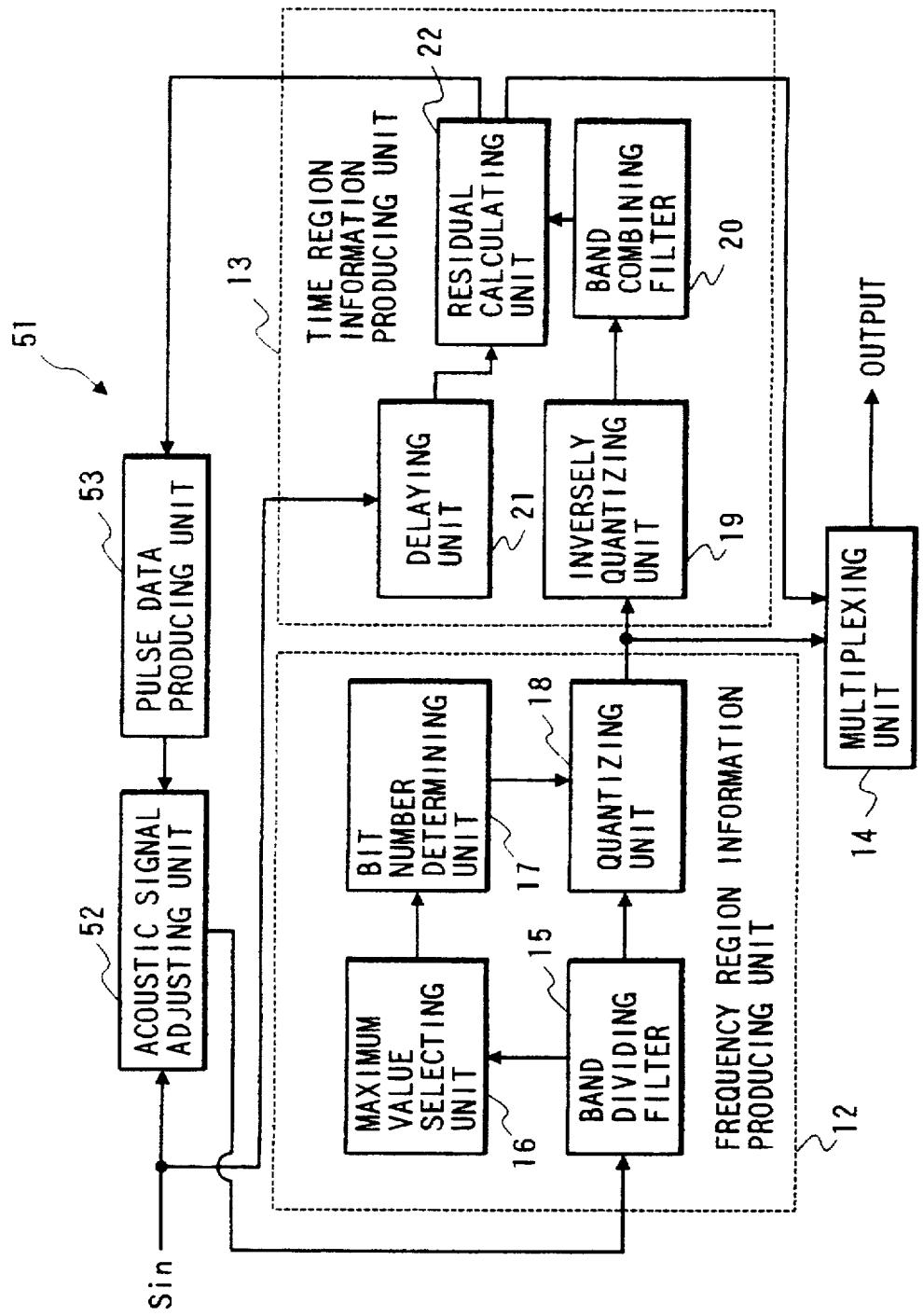
FIG. 15 is a block diagram of a digital acoustic signal coding apparatus according to an embodiment of a second concept of the present invention.

FIG. 15 is a block diagram of a digital acoustic signal coding apparatus according to an embodiment of the second concept of the present invention.

As shown in FIG. 15, a digital acoustic signal coding apparatus 51 comprises an acoustic signal adjusting unit 52 for receiving a plurality of frames of digital acoustic signals frame by frame, adjusting a current frame of digital acoustic signal Sin composed of a plurality of samples by adding a piece of pulse data to a particular sample of the signal Sin to produce an adjusted digital acoustic signal Sad, temporarily storing the adjusted digital acoustic signal Sad and repeatedly adjusting the adjusted digital acoustic signal Sad by adding another piece of pulse data to another particular sample of the adjusted digital acoustic signal Sad to newly produce another adjusted digital acoustic signal Sad, the band dividing filter 15 for dividing a plurality of samples included in the adjusted digital acoustic signal Sad into a plurality of sub-band groups and outputting one or more pieces of sub-band data for each of the sub-bands, the maximum value selecting unit 16, the bit number determining unit 17, the quantizing unit 18, the inversely quantizing unit 19, the band combining filter 20, the delaying unit 21, the residual calculating unit 22 for initially calculating a residual signal from a difference between the current frame of digital acoustic signal Sin delayed by the delaying unit 21 and a band combining signal obtained in the band combining filter 20 as the time region correcting information and repeatedly calculating an adjusted residual signal from a difference between the current frame of digital acoustic signal Sin delayed by the delaying unit 21 and an adjusted band combining signal obtained from the adjusted digital acoustic signal Sad in the band combining filter 20 as the time region corrected information, a pulse data producing unit 53 for producing a target bit allocation number Nt according to the residual signal or the adjusted residual signal output from the residual calculating unit 22 and producing one piece of pulse data added to the acoustic signal adjusting unit 52 each time the residual signal or the adjusted residual signal is received until all pieces of residual data of the adjusted residual signal can be expressed by Nt bits, and the multiplexing unit 14.

In the above configuration, an operation in the acoustic signal coding apparatus 11 is described with reference to FIG. 16.

FIG. 16 is a flow chart showing a coding operation performed in the digital acoustic signal coding apparatus shown in FIG. 15.

A digital acoustic signal Sin (or original signal) is supplied to the acoustic signal adjusting unit 52 and the delaying unit 21. In the acoustic signal adjusting unit 52, a piece of pulse data produced in the pulse data producing unit 53 is added to the digital acoustic signal Sin to produce an adjusted digital acoustic signal Sad. Thereafter, the adjusted digital acoustic signal Sad is output to the band dividing filter 15. Thereafter, a frequency conversion and an inverse conversion are performed for the adjusted digital acoustic signal Sad in the band dividing filter 15, the maximum value selecting unit 16, the bit number determining unit 17, the quantizing unit 18, the inversely quantizing unit 19 and the band combining filter 20 in the same manner as those performed in the coding apparatus 11 (steps S101 to S106 and step s108). Thereafter, an adjusted residual signal composed of pieces of residual data is produced in the residual calculating unit 22 in the same manner as in the coding apparatus 11 (step S107).

Thereafter, the adjusted residual signal is transmitted to the pulse data producing unit 53 to produce the piece of pulse data, and the piece of pulse data is added to the digital acoustic signal Sin in the acoustic signal adjusting unit 52 (step S112).

The production of the piece of pulse data is described in detail with reference to FIG. 17.

Figure 17:
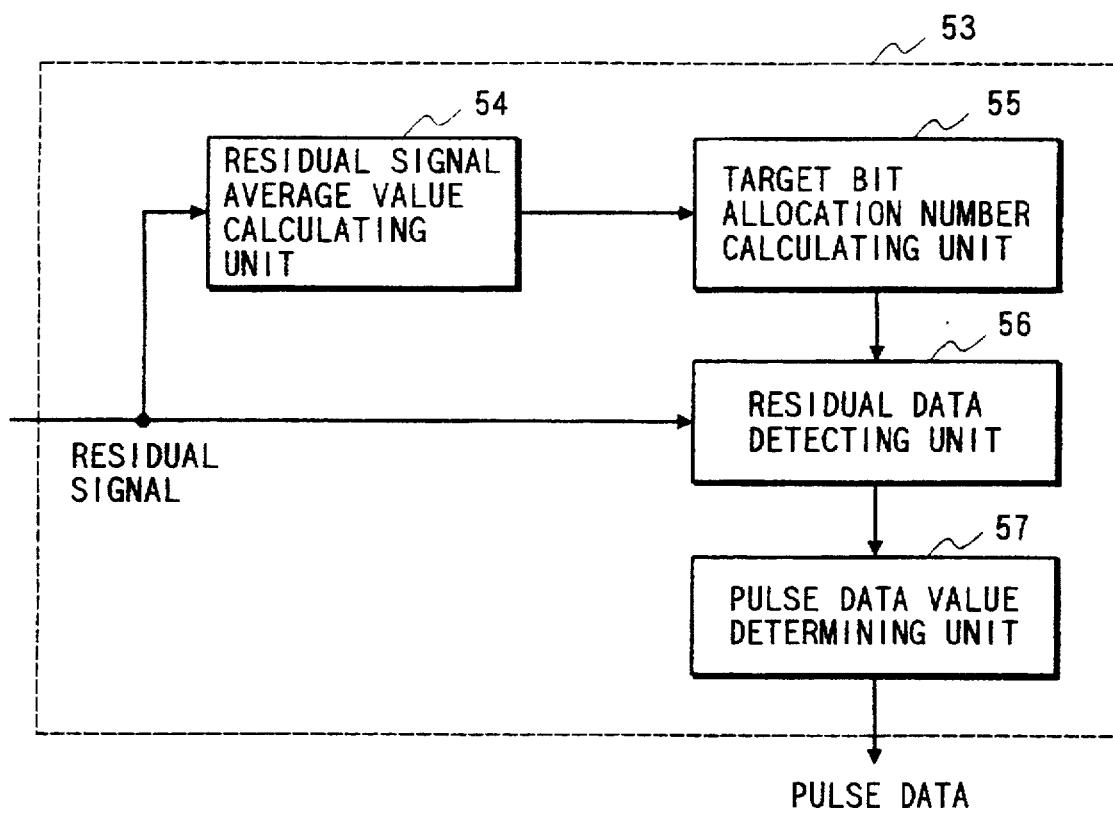
FIG. 17 is a block diagram of a pulse data producing unit shown in FIG. 15.

FIG. 17 is a block diagram of the pulse data producing unit 53.

As shown in FIG. 17, the pulse data producing unit 53 comprises a residual signal average value calculating unit 54 for calculating an average amplitude value of absolute amplitude values of the pieces of residual data of the adjusted residual signal, a target bit allocation number calculating unit 55 for calculating a target bit allocation number Nt, which denotes the number of bits expected to be allocated to each of pieces of residual data of a new adjusted residual signal in the residual calculating unit 22, according to the average amplitude value, a residual data detecting unit 56 for detecting one or more pieces of residual data having high values not able to be expressed by Nt bits from the pieces of residual data of the adjusted residual signal and selecting a piece of particular residual data having a maximum absolute value from the pieces of detected residual data, and a pulse data value determining unit 57 for determining a particular amplitude value of the piece of pulse data according to the maximum absolute value of the piece of particular residual data and the target bit allocation number Nt and determining a particular sample of the adjusted digital acoustic signal Sad to which the piece of pulse data is added in the acoustic signal adjusting unit 52.

In the above configuration, the adjusted residual signal is transmitted to the residual signal average value calculating unit 54 and the residual data detecting unit 56 of the pulse data producing unit 53. In the residual signal average value calculating unit 54, an average amplitude value of absolute amplitude values of the pieces of residual data of the adjusted residual signal is calculated.

Figure 18:
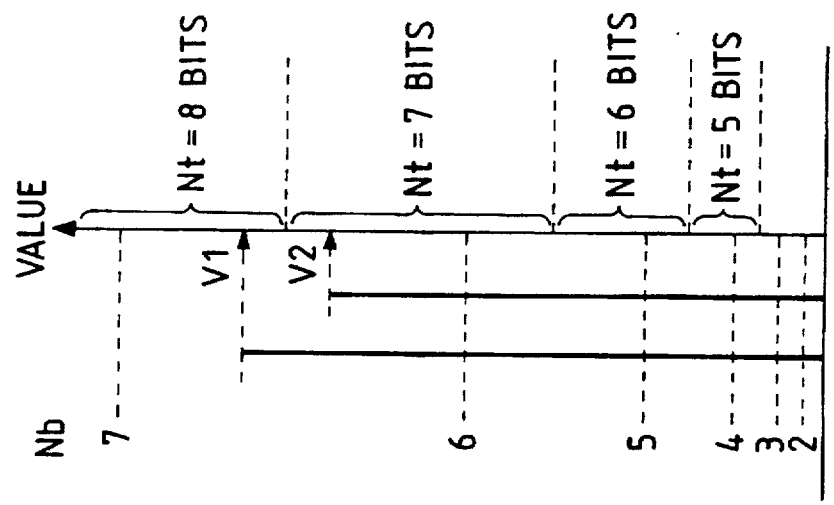
FIG. 18 shows a relationship between an average amplitude of pieces of residual data and a target bit allocation number Nt.

Thereafter, a target bit allocation number Nt is calculated according to the average amplitude value in the target bit allocation number calculating unit 55 (step S110). In detail, assuming that absolute values of all pieces of residual data of the adjusted residual signal can be brought close to the average amplitude value, a lowest limit number Nb of bits required to express each of the all pieces of residual data is equal to the number of bits required to express the average amplitude value. However, because the pieces of residual data are caused by the computing errors having no regularity, it is very difficult to make the absolute values of all pieces of residual data agree with the average amplitude value. Therefore, in cases where the average amplitude value is close to the lowest limit number Nb, there is a probability that one or more pieces of residual data of the adjusted residual signal cannot be expressed by Nb bits. In this embodiment, as shown in FIG. 18, an upper limit of the average amplitude value to which the target bit allocation number Nt is applied is determined by subtracting an allowance value from a maximum value expressed by Nt bits. That is, the target bit allocation number Nt is determined by adding an allowance to the lowest limit number Nb. For example, even though a first average amplitude value V1 is higher than a second average amplitude value V2, any of the values V1 and V2 can be expressed by 7 bits. However, in cases where the target bit allocation number Nt is determined by adding an allowance to the lowest limit number, though the target bit allocation number Nt=7 (bits) is set for the second average amplitude value V2, the target bit allocation number Nt=8 (bits) is set for the first average amplitude value V1 in the target bit allocation number calculating unit 55.

In this embodiment, the allowance is set to place an upper limit of average amplitude values, for which the target bit allocation number Nt is set, to a mid-value between a minimum value $(2^{(Nt-1)})$ and a maximum value $(2^{Nt})$ expressed by a most significant bit of Nt-bit data. However, it is applicable that the allowance be changed according to a quantization precision or the number of arithmetic operations. Also, because absolute values of all pieces of residual data of the adjusted residual signal can approach the average amplitude value as an adjusting operation performed in the acoustic signal adjusting unit 52 is repeated, the allowance can be reduced to lower the target bit allocation number Nt. However, when the number of adjusting operations is increased, the number of arithmetic operations performed in the coding apparatus 51 is increased, and a processing speed is lowered. Therefore, it is preferred that the allowance be set according to a standard deviation of a distribution of the computing errors changing with a frequency conversion method used in the coding apparatus 51 while considering the coding efficiency and the processing speed.

The target bit allocation number Nt is transmitted to the residual data detecting unit 56. In the residual data detecting unit 56, it is judged whether or not one or more pieces of residual data having high values not able to be expressed by Nt bits exist in the pieces of residual data of the adjusted residual signal (step S111). In cases where the pieces of residual data having high values not able to be expressed by Nt bits exist, the pieces of residual data are detected, and a piece of particular residual data having a maximum absolute value is selected from the pieces of detected residual data. Also, a particular residual data number of the piece of particular residual data is detected. Thereafter, the particular residual data, the particular residual data number and the target bit allocation number Nt are transmitted to the pulse data value determining unit 57.

In the pulse data value determining unit 57, a particular amplitude value is determined according to an absolute value of the particular residual data and the target bit allocation number Nt, and a particular sample of the adjusted digital acoustic signal Sad (or the digital acoustic signal Sin in a first adjusting operation) to which a piece of pulse data having the particular amplitude value is added is specified according to the particular residual data number.

Figure 19:
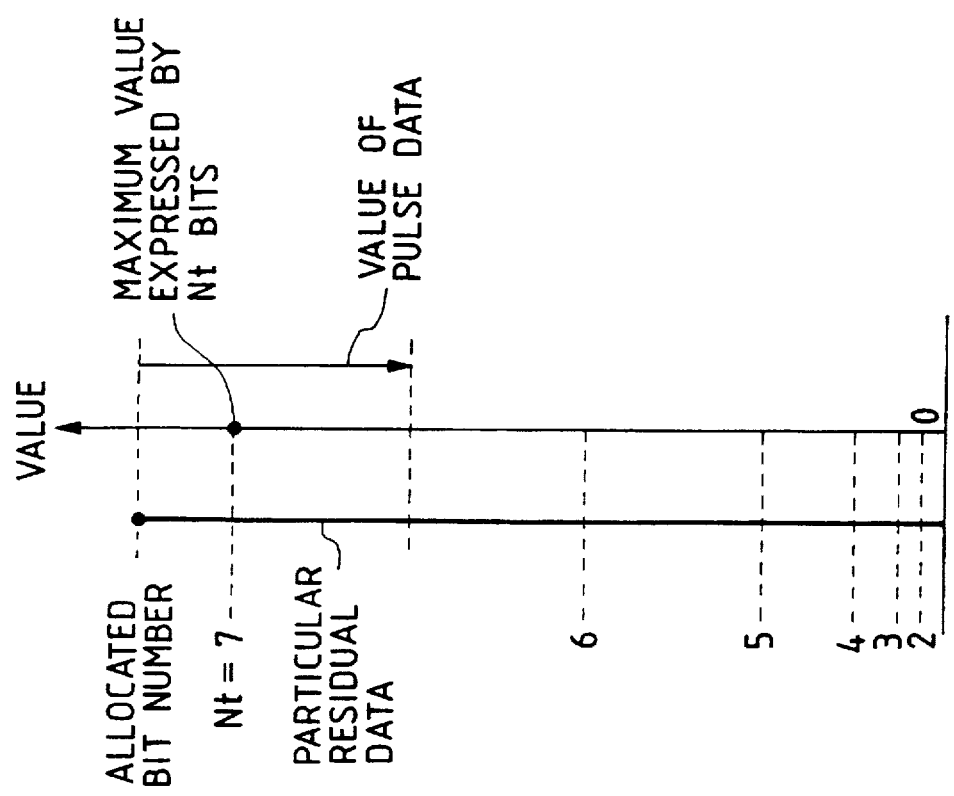
FIG. 19 shows a method for determining an absolute amplitude value of a piece of pulse data from the target bit allocation number Nt and an absolute value of a piece of particular residual data higher than a maximum value expressed by Nt bits.

An example of the determination of the particular amplitude value is shown in FIG. 19. An absolute value of the particular amplitude value of the pulse data is calculated by subtracting ¾ of a maximum value expressed by Nt bits from an absolute value of the particular residual data. Thereafter, the pulse data is set to a sign inverse to that of the particular residual data. Because ¾ of the maximum value expressed by Nt bits is equal to a mid-value between a minimum value $(2^{(Nt-1)})$ and a maximum value $(2^{Nt})$ expressed by a most significant bit of Nt-bit data, the influence of noises produced from the pulse data on other pieces of residual data of a new adjusted residual signal produced in the residual calculating unit 22 can be reduced to the lowest degree.

Thereafter, the pulse data having the particular amplitude value is transmitted to the acoustic signal adjusting unit 52 and is added to the particular sample of the adjusted digital acoustic signal Sad. Therefore, an adjusted digital acoustic signal Sad is newly produced in an adjusting operation, and the adjusted digital acoustic signal Sad newly produced is processed in the frequency and time region information producing units 12 and 13 in the same manner, and an adjusted residual signal is newly produced in the residual calculating unit 22. Therefore, an amplitude value of a piece of residual data of the new adjusted residual signal corresponding to the particular sample of the particular sample of the adjusted digital acoustic signal Sad becomes lower than a maximum value expressed by Nt bits.

Thereafter, an average amplitude value, a target bit allocation number Nt and one piece of particular residual data having a absolute value higher than the maximum value expressed by Nt bits are again determined in the pulse data producing unit 53, and a piece of pulse data is added to the adjusted digital acoustic signal Sad in the acoustic signal adjusting unit 52. This adjusting operation is repeated until absolute amplitude values of all pieces of residual data of an adjusted residual signal recently produced becomes lower than a maximum value expressed by Nt bits. When amplitude values of all pieces of residual data becomes lower than a maximum value expressed by Nt bits (step S111), each of the pieces of residual data of the adjusted residual signal recently produced is expressed by Nt bits, and the adjusted residual signal recently produced is multiplexed in the multiplexing unit 14 (step S109).

In the above repeated adjusting operations, there is a probability that a value of a piece of sub-band data output from the band dividing filter 15 exceeds a maximum value expressed by Na-bit data (the allowable bit allocation number Na determined in the bit number allocating unit 17) because the adjusted digital acoustic signal Sad is slightly changed in the frequency conversion performed in the band dividing filter 15. In this case, the allowable bit allocation number Na is not increased, but the value of the piece of sub-band data is replaced with a maximum or minimum value expressed by Na-bit data (the allowable bit allocation number Na determined in the bit number allocating unit 17 for the digital acoustic signal Sin), and the allowable bit allocation number Na determined for the digital acoustic signal Sin is used for the quantization of the pieces of sub-band data performed in the following adjusting operations. Accordingly, the information volume in the time region can be reduced without being influenced by the allowable bit allocation number determined in the frequency region while fixing the information volume in the frequency region. However, in cases where the allowable bit allocation number Na determined for the adjusted digital acoustic signal Sad in one adjusting operation is lower than that determined for the digital acoustic signal Sin, it is applicable that the allowable bit allocation number Na determined for the adjusted digital acoustic signal Sad be adopted in place of the allowable bit allocation number Na determined for the digital acoustic signal Sin to reduce the information volume in the frequency region. In this case, the coding operation can be more effectively performed in the coding apparatus 51.

In the above embodiment, after the adjusting operation is repeated, all pieces of residual data of the adjusted residual signal are respectively expressed by Nt bits in the residual calculating unit 22. However, because a sign bit is required to express each piece of residual data, the number of bits actually allocated to each piece of residual data in the residual calculating unit 22 is larger than the target bit allocation number Nt by one.

Also, in the above embodiment, each time one adjusted residual signal is produced in the residual calculating unit 22 in one adjusting operation, one piece of pulse data is produced in the pulse data producing unit 53 to make one piece of particular residual data of the adjusted residual signal approach an average value of pieces of residual data of the adjusted residual signal. Therefore, in cases where the adjusted operation is repeated until absolute values of all pieces of residual data of the adjusted residual signal are sufficiently lowered, the coding efficiency for the adjusted residual signal can be improved. However, it is applicable that a plurality of pieces of pulse data corresponding to all pieces of particular residual data of the adjusted residual signal which have absolute values higher than a maximum value expressed by Nt bits be produced at one time in the pulse data producing unit 53 after the target bit allocation number Nt is determined to produce an adjusted residual signal in which absolute values of all pieces of residual data are lower than the maximum value. In this case, any piece of pulse data corresponding to a piece of residual data of the adjusted residual signal having an absolute value lower than the maximum value is not fundamentally required. However, in cases where an absolute value of the low-valued residual data is close to the maximum value and a piece of pulse data corresponding to a piece of particular residual data adjacent to the low-valued residual data is added to the digital acoustic signal Sin to perform an adjusting operation, there is a probability that the absolute value of the low-valued residual data is increased to a value higher than the maximum value in the adjusting operation because a noise occurring from the pulse data influences on the low-valued residual data. Therefore, it is preferred that a piece of pulse data corresponding to a piece of low-valued residual data which has an absolute value close to the maximum value be added to the digital acoustic signal Sin in cases where a piece of pulse data corresponding to a piece of particular residual data adjacent to the low-valued residual data have an absolute value higher than the maximum value.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An acoustic signal coding method, comprising the steps of:

dividing a digital acoustic signal of time region information supplied as an original signal into one or more pieces of sub-band data for each of a plurality of sub-bands to change the digital acoustic signal of the time region information to a digital acoustic signal of frequency region information;

combining the pieces of sub-band data of all sub-bands to produce a band combined signal as a reproduced digital acoustic signal of time region information;

producing a residual signal from the digital acoustic signal of the time region information and the reproduced digital acoustic signal of the time region information as time region correcting information; and multiplexing the digital acoustic signal of the frequency region information and the time region correcting information to produce a bit stream as an output signal.

2. The acoustic signal coding method according to claim 1 in which the step of dividing a digital acoustic signal of time region information further includes the steps of:

detecting a maximum value among the pieces of sub-band data for each of the sub-bands, each piece of sub-band data being expressed at a fixed quantization bit precision;

producing bit allocating information indicating a minimum bit number required to express the maximum value among the pieces of sub-band data of one sub-band for each of the sub-bands; and reducing the number of bits used in each piece of sub-band data by a reducing number Nr according to the bit allocating information for each sub-band to produce the digital acoustic signal of the frequency region information composed of the pieces of sub-band data, the pieces of sub-band data of the digital acoustic signal of the frequency region information being respectively expressed by an allowed number of bits indicated by the bit allocating information,for each sub-band, and the step of combining the pieces of sub-band data of all sub-bands further includes the step of:

adding Nr bits to the pieces of sub-band data of the digital acoustic signal of the frequency region information for each sub-band before the pieces of sub-band data of all sub-bands are combined on condition that values of the Nr bits added to each piece of sub-band data are the same as that of a sign bit of the piece of sub-band data.

3. The acoustic signal coding method according to claim 1 in which the step of producing a residual signal further includes the step of:

delaying the digital acoustic signal of the time region information supplied as the original signal before the residual signal is produced to cancel the delay of the reproduced digital acoustic signal of the time region information caused by the division of the digital acoustic signal of the time region information and the combination of the pieces of sub-band data.

4. An The acoustic signal coding method according to claim 1 in which the step of combining the pieces of sub-band data of all sub-bands further includes the steps of:

detecting a maximum value among the pieces of sub-band data of the band combined signal, each piece of sub-band data being expressed at a fixed quantization bit precision;

producing bit allocating information indicating a minimum bit required to express the maximum value among the pieces of sub-band data of one sub-band; and reducing the number of bits used in each piece of sub-band data by a reducing number Nr according to the bit allocating information to produce the reproduced digital acoustic signal of the time region information composed of the pieces of sub-band data, the pieces of sub-band data of the digital acoustic signal of the frequency region information being respectively expressed by an allowed number of bits indicated by the bit allocating information.

5. An acoustic signal coding and decoding method, comprising the steps of:

dividing a digital acoustic signal of time region information supplied as an original signal into one or more pieces of sub-band data for each of a plurality of sub-bands to change the digital acoustic signal of the time region information to a digital acoustic signal of frequency region information;

combining the pieces of sub-band data of all sub-bands to produce a band combined signal as a first reproduced digital acoustic signal of the time region information;

producing a residual signal from the first reproduced digital acoustic signal of the time region information and the digital acoustic signal of the time region information as time region correcting information;

multiplexing the digital acoustic signal of the frequency region information and the time region correcting information to a bit stream;

demultiplexing the bit stream to separate the digital acoustic signal of the frequency region information from the time region correcting information;

combining the pieces of sub-band data of all sub-bands included in the digital acoustic signal of the frequency region information to produce a second reproduced digital acoustic signal of the time region information; and correcting the second reproduced digital acoustic signal of the time region information according to the time region correcting information demultiplexed.

6. An The acoustic signal coding and decoding method according to claim 5 in which the step of dividing a digital acoustic signal of time region information further includes the steps of:

detecting a maximum value among the pieces of sub-band data for each of the sub-bands, each niece of sub-band data being expressed at a fixed quantization bit precision;

producing bit allocating information indicating a minimum bit number required to express the maximum value among the pieces of sub-band data of one sub-band for each of the sub-bands; and reducing the number of bits used in each piece of sub-band data by a reducing number Nr according to the bit allocating information for each sub-band to produce the digital acoustic signal of the frequency region information composed of the pieces of sub-band data, the pieces of sub-band data of the digital acoustic signal of the frequency region information being respectively expressed by an allowed number of bits indicated by the bit allocating information for each sub-band, the step of combining the pieces of sub-band data of all sub-bands to produce a band combined signal further includes the step of:

adding Nr bits to the pieces of sub-band data of the digital acoustic signal of the frequency region information for each sub-band before the pieces of sub-band data of all sub-bands are combined on condition that values of the Nr bits added to each piece of sub-band data are the same as that of a sign bit of the piece of sub-band data, and the step of combining the pieces of sub-band data of all sub-bands included in the digital acoustic signal further includes the step of:

adding Nr bits having the same value as that of a sign bit of each piece of sub-band data to each piece of sub-band data of the digital acoustic signal of the frequency region information for each sub-band before the pieces of sub-band data of all sub-bands are combined on condition that values of the Nr bits added to each piece of sub-band data are the same as that of a sign bit of the piece of sub-band data.

7. The acoustic signal coding and decoding method according to claim 5 in which the step of producing a residual signal further includes the step of:

delaying the digital acoustic signal of the time region information supplied as the original signal before the residual signal is produced to cancel the delay of the first reproduced digital acoustic signal of the time region information caused by the division of the digital acoustic signal of the time region information and the combination of the pieces of sub-band data for the production of the first reproduced digital acoustic signal and to cancel the delay of the second reproduced digital acoustic signal of the time region information caused by the division of the digital acoustic signal of the time region information and the combination of the pieces of sub-band data for the production of the second reproduced digital acoustic signal.

8. An acoustic signal coding apparatus comprising:

a band dividing filter for dividing a digital acoustic signal of time region information supplied as an original signal into one or more pieces of sub-band data for each of a plurality of sub-bands to change the digital acoustic signal of the time region information to a digital acoustic signal of frequency region information;

a maximum value selecting unit for selecting a maximum value among the pieces of sub-band data divided by the band dividing filter for each of the sub-bands, each piece of sub-band data being expressed at a fixed quantization bit precision;

a bit allocating information producing unit for producing bit allocating information indicating a minimum bit number required to express the maximum value selected by the maximum value selecting unit among the pieces of sub-band data of one sub-band for each of the sub-bands;

a quantizing unit for reducing the number of bits used in each piece of sub-band data divided by the band dividing filter by a reducing number Nr according to the bit allocating information produced by the bit allocating information producing unit for each sub-band to produce the digital acoustic signal of the frequency region information composed of the pieces of sub-band data, the pieces of sub-band data of the digital acoustic signal of the frequency region information being respectively expressed by an allowed number of bits indicated by the bit allocating information for each sub-band;

an inversely quantizing unit for adding Nr bits to each piece of sub-band data of one sub-band, in which the number of bits is reduced by the reducing number Nr by the quantizing unit, for each sub-band on condition that values of the Nr bits added to each piece of sub-band data are the same as that of a sign bit of the niece of sub-band data;

a band combining filter for combining the pieces of sub-band data of all sub-bands produced by the inversely quantizing unit to produce a band combined signal as a reproduced digital acoustic signal of time region information;

a residual signal producing unit for producing a residual signal from the digital acoustic signal of the time region information and the reproduced digital acoustic signal of the time region information produced by the band combining filter and outputting the residual signal as time region correcting information; and a multiplexing unit for multiplexing the digital acoustic signal of the frequency region information produced by the quantizing unit and the time region correcting information produced by the residual signal producing unit to produce a bit stream as an output signal.

9. The acoustic signal coding apparatus according to claim 8, further comprising:

a delaying unit for delaying the digital acoustic signal of the time region information supplied as the original signal to cancel the delay of the reproduced digital acoustic signal of the time region information caused by the division of the digital acoustic signal of the time region information performed by the band dividing filter and the combination of the pieces of sub-band data performed by the band combining filter.

10. An acoustic signal coding and decoding apparatus comprising:

a band dividing filter for dividing a digital acoustic signal of time region information supplied as an original signal into one or more pieces of sub-band data for each of a plurality of sub-bands to change the digital acoustic signal of the time region information to a digital acoustic signal of frequency region information;

a maximum value selecting unit for selecting a maximum value among the pieces of sub-band data divided by the band dividing filter for each of the sub-bands, each piece of sub-band data being expressed at a fixed quantization bit precision;

a bit allocating information producing unit for producing bit allocating information indicating a minimum bit number required to express the maximum value selected by the maximum value selecting unit among the pieces of sub-band data of one sub-band for each of the sub-bands;

a quantizing unit for reducing the number of bits used in each piece of sub-band data divided by the band dividing filter by a reducing number Nr according to the bit allocating information produced by the bit allocating information producing unit for each sub-band to produce the digital acoustic signal of the frequency region information composed of the pieces of sub-band data, the pieces of sub-band data of the digital acoustic signal of the frequency region information being respectively expressed by an allowed number of bits indicated by the bit allocating information for each sub-band;

a first inversely quantizing unit for adding Nr bits to the pieces of sub-band data of one sub-band, in which the number of bits is reduced by the reducing number Nr by the quantizing unit, for each sub-band on condition that values of the Nr bits added to each piece of sub-band data are the same as that of a sign bit of the piece of sub-band data;

a first band combining filter for combining the pieces of sub-band data of all sub-bands produced by the first inversely quantizing unit to produce a band combined signal as a first reproduced digital acoustic signal of time region information;

a residual signal producing unit for producing a residual signal from the digital acoustic signal of the time region information and the first reproduced digital acoustic signal of the time region information produced by the first band combining filter and outputting the residual signal as time region correcting information;

a multiplexing unit for multiplexing the digital acoustic signal of the frequency region information produced by the quantizing unit and the time region correcting information produced by the residual signal producing unit to produce a bit stream as an output signal;

a demultiplexing unit for demultiplexing the bit stream produced by the multiplexing unit to separate the digital acoustic signal of the frequency region information from the time region correcting information;

a second inversely quantizing unit for adding Nr bits to the pieces of sub-band data of the digital acoustic signal of the frequency region information demultiplexed by the demultiplexing unit for each sub-band on condition that a value of the Nr bits added to each piece of sub-band data is the same as that of a sign bit of the piece of sub-band data;

a second band combining filter for combining the pieces of sub-band data of all sub-bands in the digital acoustic signal of the frequency region information produced by the second inversely quantizing unit to produce a second reproduced digital acoustic signal of the time region information; and a residual correcting unit for correcting the second reproduced digital acoustic signal of the time region information produced by the second band combining filter according to the time region correcting information demultiplexed by the demultiplexing unit.

11. The acoustic signal coding and decoding apparatus according to claim 10, further comprising:

a delaying unit for delaying the digital acoustic signal of the time region information supplied as the original signal to cancel the delay of the first reproduced digital acoustic signal of the time region information caused by the division of the digital acoustic signal of the time region information performed by the band dividing filter and the combination of the pieces of sub-band data performed by the first band combining filter and to cancel the delay of the second reproduced digital acoustic signal of the time region information caused by the division of the digital acoustic signal of the time region information performed by the band dividing filter and the combination of the pieces of sub-band data performed by the second band combining filter.

12. An acoustic signal coding method, comprising the steps of:

receiving a digital acoustic signal of time region information as an original signal;

dividing the digital acoustic signal of time region information into one or more pieces of sub-band data for each of a plurality of sub-bands to change the digital acoustic signal of the time region information to a digital acoustic signal of frequency region information;

combining the pieces of sub-band data of all sub-bands to produce a band combined signal as a reproduced digital acoustic signal of time region information;

producing a residual signal composed of pieces of residual data from the digital acoustic signal of the time region information received as the original signal and the reproduced digital acoustic signal of the time region information as time region correcting information;

producing a piece of pulse data according to the residual signal on condition that a residual value of one piece of having an absolute value higher than a maximum value, which is expressed by a prescribed number of bits determined according to an average of absolute values of the pieces of residual data of the residual signal, is made lower than the maximum value in cases where the residual signal is again produced from a new digital acoustic signal of time region information obtained by adding the pulse data to the digital acoustic signal of time region information;

adding the pulse data to the digital acoustic signal of time region information to produce an adjusted digital acoustic signal of frequency region information from the digital acoustic signal of time region information;

producing an adjusted reproduced digital acoustic signal of time region information from the adjusted digital acoustic signal of frequency region information;

producing an adjusted residual signal from the adjusted reproduced digital acoustic signal of time region information as adjusted time region correcting information; and multiplexing the digital acoustic signal of the frequency region information and the adjusted time region correcting information to produce a bit stream as an output signal.

13. The acoustic signal coding method according to claim 12, in which the step of producing a piece of pulse data comprises the steps of:

calculating the average value of the residual values of the residual signal;

determining a target bit allocation number Nt according to the average value;

detecting a piece of particular residual data of the residual signal having an absolute value higher than a maximum value expressed by Nt bits from the pieces of residual data of the residual signal;

determining a particular sample of the digital acoustic signal of time region information corresponding to the particular residual data of the residual signal;

determining a pulse value of the pulse data according to the target bit allocation number Nt and the absolute value of the particular residual data to reduce a value of the particular residual data of the residual signal in cases where the residual signal is produced from the digital acoustic signal of time region information in which the pulse data having the pulse value is added to the particular sample;

producing the pulse data having the pulse value, and the step of adding the pulse data includes the step of adding the pulse data having the pulse value to the particular sample of the digital acoustic signal of time region information.

14. The acoustic signal coding method according to claim 13, in which the step of determining a target bit allocation number Nt comprises the steps of:

setting an upper limit of values, to which the target bit allocation number Nt is applied, to a value obtained by subtracting an allowance value from a maximum value expressed by Nt bits; and determining the target bit allocation number Nt applied for the average value on condition that the average value is equal to or lower than the upper limit of the target bit allocation number Nt and the average value is higher than an upper limit of another target bit allocation number Nt−1.

15. The acoustic signal coding method according to claim 13, in which the step of determining a pulse value comprises the steps of:

calculating a difference between ¾ of a maximum value expressed by Nt bits and the absolute value of the particular residual data; setting the difference to an absolute value of the pulse value; and setting the pulse value to a sign inverse to that of the particular sample of the digital acoustic signal of time region information.

16. The acoustic signal coding method according to claim 12, in which the step of dividing the digital acoustic signal of time region information, the step of combining the pieces of sub-band data of all sub-bands, the step of producing a residual signal, the step of producing a piece of pulse data and the step of adding the pulse data are repeated until absolute values of all pieces of residual data of the adjusted residual signal become lower than a prescribed value.

17. The acoustic signal coding method according to claim 12, in which the step of producing a piece of pulse data comprises the steps of:

detecting one or more pieces of particular residual data having absolute values higher than a prescribed value from the pieces of residual data of the residual signal; and producing one or more pieces of pulse data corresponding to the pieces of particular residual data to make residual values of the particular residual data of the residual signal lower than the prescribed value in cases where the pieces of pulse data are added to the digital acoustic signal of time region information to again produce the residual signal.

18. An acoustic signal coding apparatus, comprising:

a band dividing filter for dividing a digital acoustic signal of time region information supplied as an original signal into one or more pieces of sub-band data for each of a plurality of sub-bands to change the digital acoustic signal of the time region information to a digital acoustic signal of frequency region information;

a maximum value selecting unit for selecting a maximum value among the pieces of sub-band data divided by the band dividing filter for each of the sub-bands;

a bit allocating information producing unit for producing bit allocating information indicating a minimum bit number required to express the maximum value selected by the maximum value selecting unit among the pieces of sub-band data of one sub-band according to the maximum value selected by the maximum value selecting unit for each of the sub-bands;

a quantizing unit for reducing the number of bits used in each piece of sub-band data divided by the band dividing filter by a reducing number Nr according to the bit allocating information produced by the bit allocating information producing unit for each sub-band to produce the digital acoustic signal of the frequency region information composed of the pieces of sub-band data, the pieces of sub-band data of the digital acoustic signal of the frequency region information being respectively expressed by an allowed number of bits indicated by the bit allocating information for each sub-band;

an inversely quantizing unit for adding Nr bits to the pieces of sub-band data of one sub-band, in which the number of bits is reduced by the reducing number Nr by the quantizing unit, for each sub-band on condition that values of the Nr bits added to each piece of sub-band data are the same as that of a sign bit of the piece of sub-band data;

a band combining filter for combining the pieces of sub-band data of all sub-bands produced by the inversely quantizing unit to produce a band combined signal as a reproduced digital acoustic signal of time region information;

a residual signal producing unit for producing a residual signal composed of pieces of residual data from the digital acoustic signal of the time region information and the reproduced digital acoustic signal of the time region information produced by the band combining filter, each piece of residual data having a residual value;

a pulse data producing unit for producing a piece of pulse data according to the residual signal produced by the residual signal producing unit on condition that a residual value of one piece of residual data having an absolute value higher than a maximum value, which is expressed by a prescribed number of bits determined according to an average of absolute values of the pieces of residual data of the residual signal, is made lower than the prescribed value in cases where the residual signal is again produced from a new digital acoustic signal of time region information obtained by adding the pulse data to the digital acoustic signal of time region information;

an acoustic signal adjusting unit for adding the pulse data produced by the pulse data producing unit to the digital acoustic signal of time region information to produce an adjusted digital acoustic signal of time region information and produce an adjusted residual signal from the adjusted reproduced digital acoustic signal of time region information as adjusted time region correcting information in the residual signal producing unit through the band dividing filter, the quantizing unit, the inversely quantizing unit and the band combining filter; and a multiplexing unit for multiplexing the digital acoustic signal of the frequency region information produced by the quantizing unit and the adjusted time region correcting information produced by the residual signal producing unit to produce a bit stream as an output signal.

19. The acoustic signal coding apparatus according to claim 18 in which the pulse data producing unit comprises:

a residual signal average value calculating unit for calculating the average value of the residual values of the residual signal;

a target bit allocation number determining unit for determining a target bit allocation number Nt according to the average value calculated by the residual signal average value calculating unit;

a residual data detecting unit for detecting a piece of particular residual data of the residual signal having an absolute value higher than a maximum value expressed by Nt bits determined by the target bit allocation number determining unit from the pieces of residual data of the residual signal;

pulse data value determining unit for determining a particular sample of the digital acoustic signal of time region information corresponding to the particular residual data of the residual signal detected by the residual data detecting unit, determining a pulse value of the pulse data according to the target bit allocation number Nt determined by the target bit allocation number determining unit and the absolute value of the particular residual data detected by the residual data detecting unit to reduce a value of the particular residual data of the residual signal in cases where the residual signal is produced from the digital acoustic signal of time region information in which the pulse data having the pulse value is added to the particular sample and producing the pulse data having the pulse value.

* * * * *

UNITED STATES PATENT AND TRADEMARK OFFICE
CERTIFICATE OF CORRECTION

PATENT NO. : 5,794,179
DATED : August 11, 1998
INVENTOR(S) : Takaaki Yamabe

It is certified that error appears in the above-indentified patent and that said Letters Patent is hereby corrected as shown below: On the title page: Item [54] and Column 1, line 3, Change: "Method and Apparatus For Performing Bit-Allocation Coding For An Acoustic Signal Of Frequency Region And Time Region Correction For An Acoustic Signal And Method And Apparatus For Decoding A Decoded Acoustic Signal" to
-- Method And Apparatus For Performing Bit-Allocation Coding For An Acoustic Signal Of Frequency Region And Time Region Correction For An Acoustic Signal And Method And Apparatus For Decoding A Coded Acoustic Signal--

Signed and Sealed this

Fourteenth Day of September, 1999

Attest:

Q. TODD DICKINSON

*Attesting Officer*      *Acting Commissioner of Patents and Trademarks*